United States Patent [19]

Thompson et al.

[11] Patent Number: 5,539,893
[45] Date of Patent: Jul. 23, 1996

[54] MULTI-LEVEL MEMORY AND METHODS FOR ALLOCATING DATA MOST LIKELY TO BE USED TO THE FASTEST MEMORY LEVEL

[75] Inventors: Steven A. Thompson, Coatesville; Chandra S. Pawar, Harleysville, both of Pa.

[73] Assignee: Unisys Corporation, Blue Bell, Pa.

[21] Appl. No.: 153,520

[22] Filed: Nov. 16, 1993

[51] Int. Cl.⁶ .................................................. G06F 13/00
[52] U.S. Cl. .......................... 395/449; 395/444; 395/446; 395/463; 364/239.6; 364/243.45; 364/244.3; 364/246.11; 364/246.12; 364/254.5; 364/254.6; 364/957.6; 364/964.343; 364/966.6; 364/DIG. 1; 364/DIG. 2
[58] Field of Search .................................... 395/446, 449, 395/463, 444; 364/239.6, 243.45, 244.3, 246.11, 246.12, 254.5, 254.6, 957.6, 964.343, 966.6

[56] References Cited

U.S. PATENT DOCUMENTS

| | | | |
|---|---|---|---|
| 3,786,432 | 1/1974 | Woods | 395/425 |
| 3,810,117 | 5/1974 | Healey | 395/425 |
| 3,868,644 | 2/1975 | Healey et al. | 395/425 |
| 3,889,243 | 6/1975 | Drimak | 395/425 |
| 3,958,228 | 5/1976 | Coombes et al. | 395/575 |
| 4,008,460 | 2/1977 | Bryant et al. | 395/425 |
| 4,181,937 | 1/1980 | Hattori et al. | 395/250 |
| 4,463,420 | 7/1984 | Fletcher | 395/425 |
| 4,463,424 | 7/1984 | Mattson et al. | 395/425 |
| 4,464,712 | 8/1984 | Fletcher | 395/425 |
| 4,489,378 | 12/1984 | Dixon et al. | 395/425 |
| 4,607,331 | 8/1986 | Goodrich, Jr. et al. | 395/425 |
| 4,636,946 | 1/1987 | Hartung et al. | 395/425 |
| 4,779,194 | 10/1988 | Jennings et al. | 395/650 |
| 4,796,178 | 1/1989 | Jennings et al. | 395/650 |
| 4,797,814 | 1/1989 | Brenza | 395/425 |
| 4,835,686 | 5/1989 | Furuya et al. | 395/425 |
| 4,905,141 | 2/1990 | Brenza | 395/425 |
| 4,920,478 | 4/1990 | Furuya et al. | 395/425 |
| 4,962,451 | 10/1990 | Case et al. | 395/600 |
| 4,967,414 | 10/1990 | Lusch et al. | 371/51.1 |
| 4,996,641 | 2/1991 | Talgam et al. | 395/425 |
| 5,010,482 | 4/1991 | Keller et al. | 395/275 |
| 5,237,681 | 8/1993 | Kagan et al. | 395/600 |

*Primary Examiner*—Tod R. Swann
*Assistant Examiner*—Frank J. Asta
*Attorney, Agent, or Firm*—Robert R. Axenfeld; Mark T. Starr

[57] ABSTRACT

The present invention provides a multi-level memory system with a multi-level memory structure and methods for allocating data among the levels of memory based on the likelihood of imminent future use. The multi-level memory structure includes a first level memory that stores the data most likely to be imminently accessed, a second level memory that stores data transferred from the first level memory when the first level memory is full, and a third level memory that stores data that is the least recently used when the second level memory is full. According to the invention, predetermined criteria and statistics are used to determine which data is likely to be imminently accessed. Once the first level memory has been full, data stored in that memory level may be rearranged based on when it is likely to be accessed. The first level memory also provides for faster access than the second level memory which in turn provides faster access then the third level memory. The data in the second level memory is maintained according to a first-in-first-out algorithm. A task control processor controls the data allocation in the multi-level memory.

20 Claims, 8 Drawing Sheets

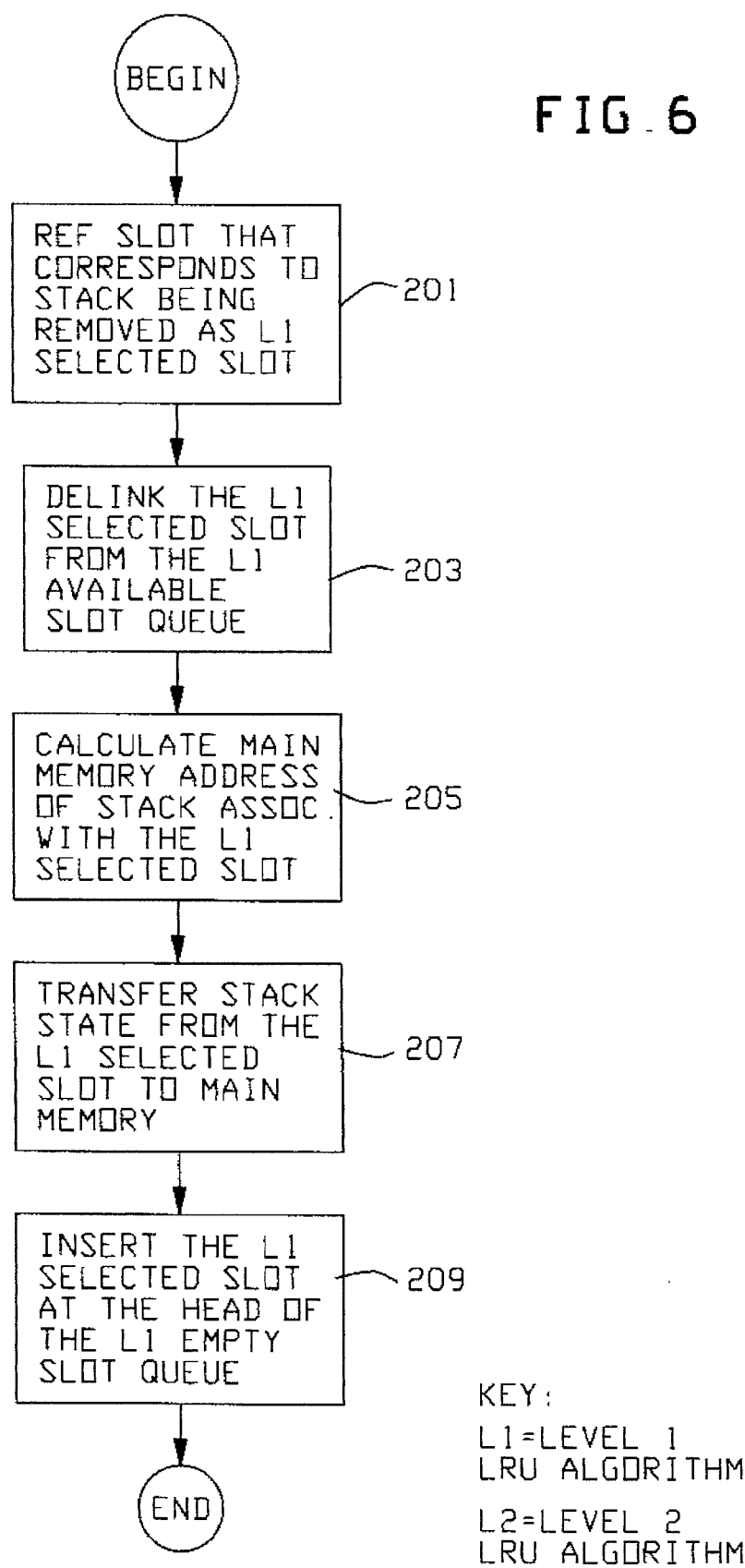

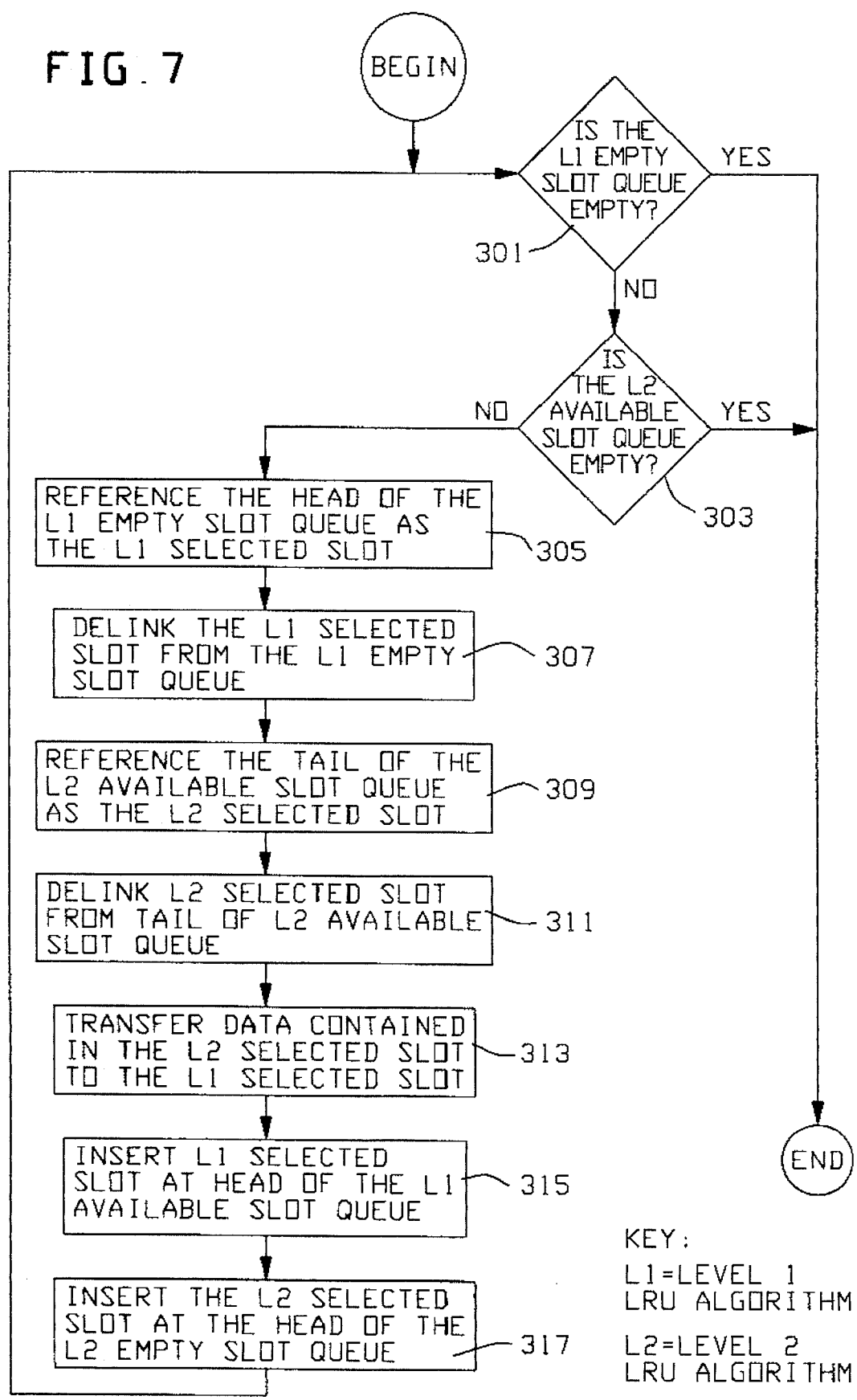

MULTI-LEVEL MEMORY AND METHODS FOR ALLOCATING DATA MOST LIKELY TO BE USED TO THE FASTEST MEMORY LEVEL

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

FIELD OF THE INVENTION

The present invention relates to electrical computers and data processing systems, and more particularly to storage assignment for storage systems for same utilizing priority resolution between storage locations. The present invention also relates to electrical computers and data processing systems, and more particularly to a plural memory configuration Storage system for same and to queue/stack allocation. The present invention further relates to a multi-event queuing mechanism and more particularly to such a mechanism for off-loading many operating system functions that would otherwise be executed by one or more central processors in a large data processing system.

The present invention also relates to priority allocation in a queue.

BACKGROUND OF THE INVENTION

There exist applications in which there is a need to repeatedly allocate data to stacks or locations within a queue based on priority, e.g. anticipated need for same. One method of doing so is a least recently used (LRU) algorithm. In an LRU algorithm, if the content of a storage location or memory location must be replaced with the content of another such location (other than to update what is stored therein), then to provide the needed space, the least recently used such value is removed. The traditional least recently used algorithm has a high degree of overhead associated with it. This is because every access to the resource causes some update by the management algorithm.

Numerous patents refer to the use of an LRU algorithm to manage a cache. One such patent is U.S. Pat. No. 4,489,378 "Automatic Adjustment of the Quantity of Prefetch Data in a Disk Cache Operation" issued Dec. 18, 1984 to Jerry D. Dixon et al. In that patent, the LRU table has one listing for each page in cache memory. The forward pointer in each listing of the LRU table points to the listing of a more recently used page, and the forward pointer of the most recently used listing points to the first free page. Similarly, the backward pointer of each LRU listing points to a less recently used page and the last of that chain is the least recently used page. When a page is written, the page then becomes the most recently used listing in the LRU table. The listing's backward pointer points to the most recently used listing, and its directory pointer points to the first free page.

U.S. Pat. No. 4,464,712 "Second Level Cache Replacement Method and Apparatus" issued Aug. 7, 1984 to Robert P. Fletcher discloses a two level cache where the first level is a fast yet limited size cache in use by the processor. The second level is a slower yet larger cache which contains data that is already in the first level cache as well as additional data. Both caches are managed on a least recently used method. For that method, "use" for the second level is defined as any access either directly to the second level cache or to the first level cache where the data in the first level cache is also in the second level cache. Thus, there is duplication of data in the caches.

SUMMARY OF THE INVENTION

Accordingly, an object of the present invention is to optimize the usage of memory resources.

Another object of the present invention is to optimize data access requirements based on data usage requirements.

A further object of the present invention is to optimize data access requirements by minimizing memory access times.

Still another object of the present invention is to increase the likelihood that data resources which will be used again soon will remain relatively readily available.

Briefly, these and other objects of the present invention are accomplished by apparatus and method for managing a two level cache. The two level cache contains a fixed number of items which are each of a fixed size. Cache level 1 is the one in active use by the processor. Cache level 2 is a slower, backing store for cache level 1. Items which are removed from cache level 1 because they have not been used recently are written to cache level 2. Items which are needed in cache level 1 and are not present there are looked for in cache level 2 before checking an even slower third level store such as in main memory. The first level cache is managed by a modified least recently used (LRU) algorithm (further described below) where only certain uses which are predictive of future use cause items in a doubly linked list to be moved to the end or tail of that cache. When the item is removed from the level 1 cache, it is placed in a doubly linked list in the level 2 cache, which is managed on a normal (unmodified) least recently used method. Items which are removed from this level 2 cache are written back to a third level store. In this apparatus and method, except for chance coincidences there are never two copies of the same data in the two caches. A data item is either in one level of cache or the other. Thus, there is no duplication of data in the caches.

A modified least recently used (LRU) algorithm is used to manage the first level cache. The items managed are placed in a doubly linked list where the least recently used item is at the head of the list and the most recently used item is at the tail of the list. Not every use of a data item would cause that item to be moved to the end of the list as the most recently used. Only certain specified uses which are predictive of another imminent use qualify as a reason to move the item to the end or tail of the list. Thus, a given item could have been recently used but remain at the head of the list eligible for removal from the first level cache if the recent use was not of the kind which qualified.

Other objects, advantages and novel features of the invention will become apparent from the following detailed description of the invention when considered in conjunction with the accompanying drawings.

BRIEF DESCRIPTION OF THE DRAWINGS

In the drawings,

FIGS. 5A, 5B, 5C, 6 and 7 are flowcharts illustrating how data allocation in the configuration of FIG. 1 and in the configuration of FIG. 3 is accomplished by the present invention.

DETAILED DESCRIPTION

Figure 1:
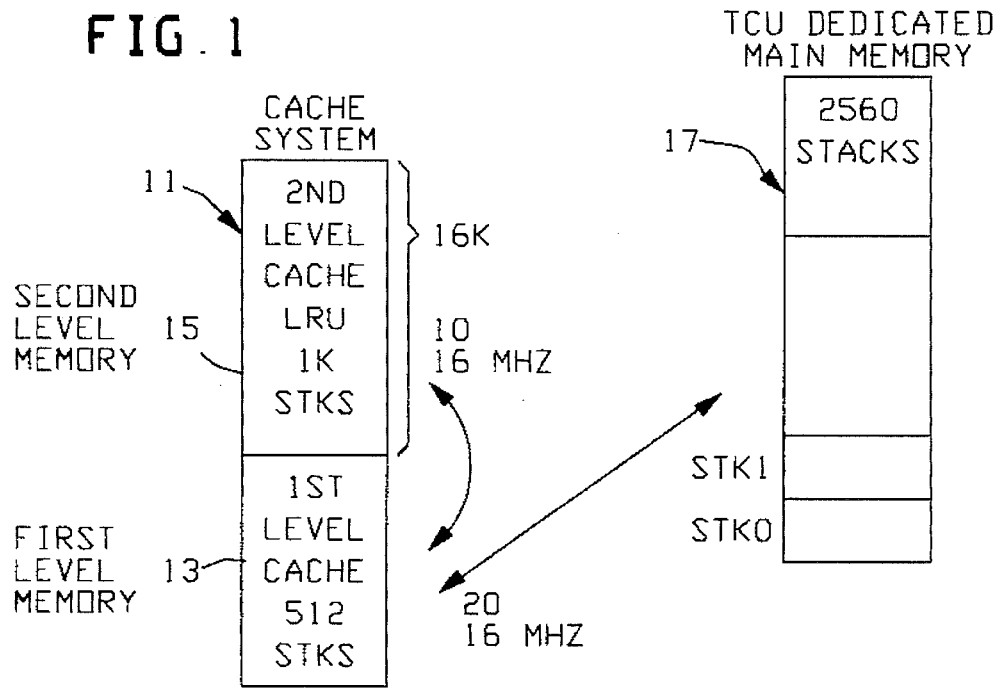
FIG. 1 is a block diagram of a data allocation and storage configuration according to the present invention.

Referring now to the drawings, wherein like reference characters designate like or corresponding parts throughout the several views, there is shown in FIG. 1 a data storage allocation arrangement including a first level memory 13, second level memory 15 and a portion of main memory 17 that is dedicated to certain task control functions described below. Data access from first level memory 13 and from second level memory 15 is considerably faster than data access from portion of main memory 17. Data access from first level memory 13 is faster than data access from second level memory 15. The storage capacity of first level memory 13 and second level memory 15 is limited. As discussed below, in toto all but 2560 words in portion of main memory 17 can be provided to first level memory 13 and second level memory 15. Although the configuration of FIG. 1 is particularly illustrative of the data allocation and storage arrangement of the A19 computer produced by Unisys Corporation, the present invention is not limited to that particular computer.

The operating system for the A19 computer will have a management routine which will permit a multi-tasking processor to handle several different tasks in a series of time segments. Since this management software is itself a task, it is advantageous to have it resident in firmware operated on by a separate microprocessor. This separate microprocessor has been referred to as the task control unit (TCU) or task control processor (TCP), and is described in U.S. Pat. No. 4,779,194 "Event Allocation mechanism for a Large Data Processing System" issued Oct. 18, 1988 to Andrew T. Jennings et al., U.S. Pat. No. 4,796,178 "Special Purpose Processor for Off-Loading Many Operating System Functions in a Large Data Processing System" issued Jan. 3, 1989 to Andrew T. Jennings et al., and U.S. Pat. No. 5,010,482 "Multi-Event Mechanism for Queuing Happened Events for a Large Data Processing System" issued Apr. 23, 1991 to John A. Keller et al. The Jennings et al. 1194 patent, the Jennings et al. 1178 patent, and the Keller et al. patent are each hereby incorporated by reference herein. The different tasks are resident in stacks. Each task is resident in a separate stack.

In general, the Unisys A-Series architecture is a stack architecture. What this means is that the central processor executes a code stream that causes the central processor to perform operations on a stack. The code stream and the corresponding stack will hereafter be referred to as either a stack or a task.

The Task Control Unit (TCU) is responsible for central processor stack scheduling, i.e., determining which stack the central processor should be executing on, at any given instant in time, and moving the central processor onto that stack. In order to accomplish this function the Task Control Unit maintains stack state and stack statistics upon which a stack scheduling algorithm is applied. The stack state and stack statistics are maintained by the Task Control Unit and are not relevant to the code stream that is executed by the central processor or the physical stack that is operated on by the central processor.

The TCU instructs the central processor to move onto a stack via a move-stack request. The central processor upon receiving a move-stack request begins to operate on the corresponding stack, i.e., executing the corresponding code stream. The central processor is said to be active on top of that stack. The TCU maintains stack state that indicates the current state of all stacks. When the central processor is active on a stack, the TCU stack state that corresponds with the active stack indicates that the stack is "alive".

While the central processor is executing on a stack, the stack may occasionally require data that does not reside in system main memory 25 (because of main memory constraints, all data cannot reside in main memory simultaneously). In this situation, the stack cannot continue until the required data is localized in main memory. The stack will be interrupted by an operating system procedure that will initiate a request for the required data and communicate to the TCU that the stack has been suspended. The TCU will instruct the central processor to move off of the suspended stack and onto a new stack, if one is available, while the required data is being localized. The TCU will transition the suspended stack's state from the "alive" state to this "waiting" state while the required data is being localized. When the required data is localized in main memory, the TCU will transition the suspended stack's state from the "waiting" state to the "ready" state.

A distinction is here being made between the actual stack that the central or main processor works with, e.g. the code stream or the data located in that stack, and the state that the TCU 33 maintains as to the state of that stack. This state can be Ready, Waiting, or Alive. The TCU 33 is a dedicated management processor, while the central processor 21 is the CPU that executes user program code. There can be many stacks running in the system at the same time. A particular computer configuration may have only one central processor 21, which is capable of executing only one stack at any given instant. The TCU 33 therefore implements a queue of Ready stacks that are available for execution (transition to the Alive state) as the central processor 21 becomes available to process that stack.

The TCU 33 maintains data, associated with stacks, that the TCU 33 needs to know in order to manage the stacks, e.g. to transition a stack from waiting to Ready. Waiting here refers to data to be localized from the portion of main memory 17 to be placed into a queue of Ready stacks. Ready stacks are those stacks that are able to run on a central processor 21 when a central processor becomes available. A stack is in an Alive state when it is currently running on the central processor 21. The TCU 33 also maintains data that allows it to determine which stack should run on the processor next, based upon a stack's priority. Most user jobs run at the same priority, and are all given the same share of the central processor 21. However, the operating system has critical functions that it needs to perform above and beyond the normal user programs, e.g. memory management. Each such function requires its own stack, and is given a higher priority in the system. Thus, different stacks can run at different priorities. Also, the user could specify a higher priority for a particular job. When the TCU 33 determines or makes a decision concerning which stack the central processor 21 should be operating on, the TCU 33 bases that decision on priority. For example, a stack of priority 100 will run before a stack of priority 50. Also, if there several stacks of the same priority, such as 10 jobs all of priority 50, then the central processor 21 is time-shared among those 10 stacks and the TCU 33 adds to the scheduling a time factor, providing priority in a time slice. What that accomplishes is if one stack requires an hour of central processor 21 time and another stack of equal priority only takes a minute of central processor 21 time, then the TCU 33 will allow each stack to take increments of central processor 21 time. After each such increment expires, the TCU 33 transfers the central processor 21 to the next stack of equal priority. If the task goes to termination (is completed) before that increment of time is up, then the TCU 33 sends the central processor 21 to another stack of equal priority. A task and a stack here mean the same thing. The purpose of this time sharing is to be fair about central processor 21 usage. A stack that only takes a minute to run should not wait for an hour while the central processor 21 is working with another stack of equal priority. Each stack of equal priority is given equal access to the central processor 21, regardless of the amount of central processor 21 time each such stack requires.

Figure 4:
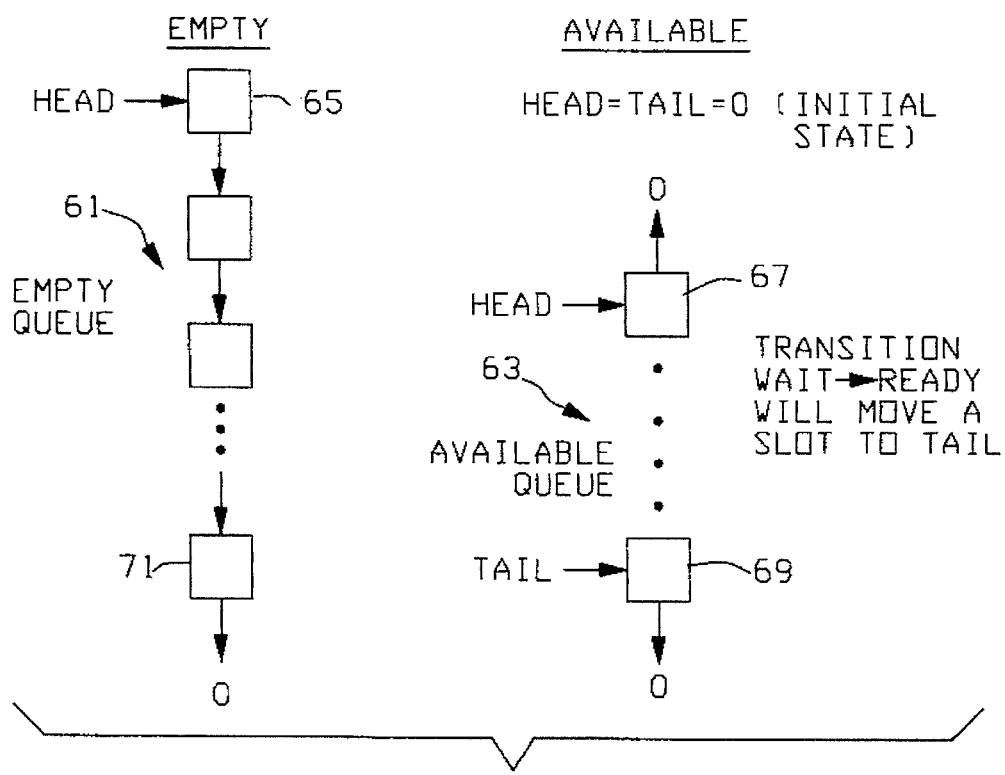
FIG. 4 is a diagrammatic representation of a portion of the data storage configuration of FIG. 1.

The A19 computer has a task control unit (TCU) 33 which manages the active stacks on the system. The portion of main memory 17, hereinafter referred to as TCU dedicated main memory 17, has been allocated to the TCU 33 as a dedicated work space in system main memory 25 where the stack state for 4096 stacks can be maintained. However, accessing this information in TCU dedicated main memory 17 takes the TCU 20 clock cycles of time. To improve this, there is a memory space in the TCU 33 itself that serves as a form of cache. For the following discussion, this cache has room to manage information for up to 512 stacks at 16 words per stack, at 54 bits per words, plus one word of stack state per stack, for example. This cache memory is software managed and takes only two clock cycles to access. The information kept with the 512 stacks is managed on a most recently used basis. That is, ideally information for the most recently used 512 stacks will be in this TCU 33 cache. This resource is managed using a least recently used algorithm in conjunction with two queues. As shown in FIG. 4, there are two queues to manage the blocks of memory available in each TCU cache. One such queue is the Empty queue 61. If a block of memory is in this Empty queue 61, it can be used (e.g. filled) immediately. The second queue is the Available queue 63. It is the Available queue 63 to which the modified least recently used algorithm applies. As a stack becomes active, a block is removed from the Empty queue 61, information is placed in the block, and that block is placed at the tail 69 of the Available queue 63. This Available queue 63 is a doubly linked list with nil terminators at the head 67 and tail 69 of the queue. Each new entry on the list is placed at the end, or tail 69, of the list. When all 512 entries in the Empty queue have been used, and a 513th stack needs to be managed, one of the current 512 blocks in the TCU first level memory 13 needs to be removed from the Available queue 63. When this occurs, the block at the head 67 of the Available queue 63 is taken out of that queue, and the information in that block is copied back to second level memory 15. Then, the new information from the new stack is written into that block, and the block is placed at the tail 69 of the Available queue 63. Thus, the entry at the head 67 of the Available queue 63 should be the one that has been in the queue the longest. This is a first-in, first-out (FIFO) approach. However, a pure FIFO approach is not appropriate for the Available queue 63 because some stacks will run on the processor more frequently than others. These more frequently used stacks should not be allowed to bubble to the head 67 of the queue and be disposed of, since they will need to be brought back in again almost immediately. As such, a least recently used algorithm would have each block in the Available queue 63 moved to the tail 69 of the queue whenever it was accessed. Unfortunately, the frequency of such modifications to the list requires too much overhead and is too expensive. Because of the frequency with which the task must be scheduled for the central processor 21, the time to manage a queue in this way is too expensive. Therefore, instead only those uses which are predictive of one or more subsequent uses in the near future cause the block or resource to be moved to the tail 69 of the Available queue 63 in the present invention, thus decreasing the possibility that this block would be removed from the head 67 of the Available queue 63.

In this embodiment, there are six basic transitions which cause an access to a block in the queue. These transitions are: the initial state or no state to the ready state; the ready state to the selected state; the selected state to either the alive or the ready state; and the alive state to the ready state or the wait state. Of these transitions, the wait-to-ready transition was determined to be predictive of additional uses of that data in the near future. That is, once a process went from wait to ready, it would be expected to be selected in the very near future. The other states were not predictive of any future use. The time spent in the selected state would be so short as to be negligible, since it would immediately run unless the CPU 21 was sending back a message at the exact same time. There is, therefore, no need to update the Available queue 63 going from ready to select. The select-to-alive transition is not considered a meaningful transition that the processor 21 had taken over. The alive-to-wait change is not predictive of a future use, since the wait state could be for an indefinite time while the necessary resource is acquired. The alive-to-ready transition is the one other state change which could be predictive of another future use. However, it is not considered significant compared to the transition from wait to ready because a task that had a transition from wait to ready would be run before a task that had a transition from alive to ready. Therefore, it is more important that a task that had made a transition from wait to ready be kept in the Available queue 63 since it would be the first to run when the central processor 21 became available. The foregoing is related to the configuration of FIG. 1 in the following manner. The A19 computer has two memories, first level memory 13 and second level memory 15 which are quickly accessible by the TCU 33. The first level memory 13 is managed in the foregoing manner for up to 512 stacks of information. The second level memory 15 manages up to 1K (1024) stacks of information. The final 2560 stacks are kept back in TCU dedicated main memory 17. The access time for the first level memory 13 requires two clock cycles. However, to get to the second level memory 15 requires about ten clock cycles. To get to the final level TCU dedicated main memory 17 back in system main memory 25 requires 20 clock cycles. When a block is removed from the Available queue 63 in the first level memory 13, it is copied back to the second level memory 15 and placed at the tail 69 of the Available queue 63 of second level memory 15. Similarly, when a block is taken out of the second level memory 15, it goes to one of two places. If it is to be actually in-use, then it is moved to the first level memory 13 and placed at the tail 69 of the Available queue 63 of first level memory 13. If, however, the block is being removed from use, that block is copied back to TCU dedicated main memory 17. The transitions which are important for first level memory 13 are as described above. That is, the transition from wait to ready causes the block so transitioned to be taken out of the Available queue 63 of first level memory 13 and placed at the tail 69 of that queue. This method is illustrated in greater detail in FIGS. 5A, 5B and 5C.

Figure 3:
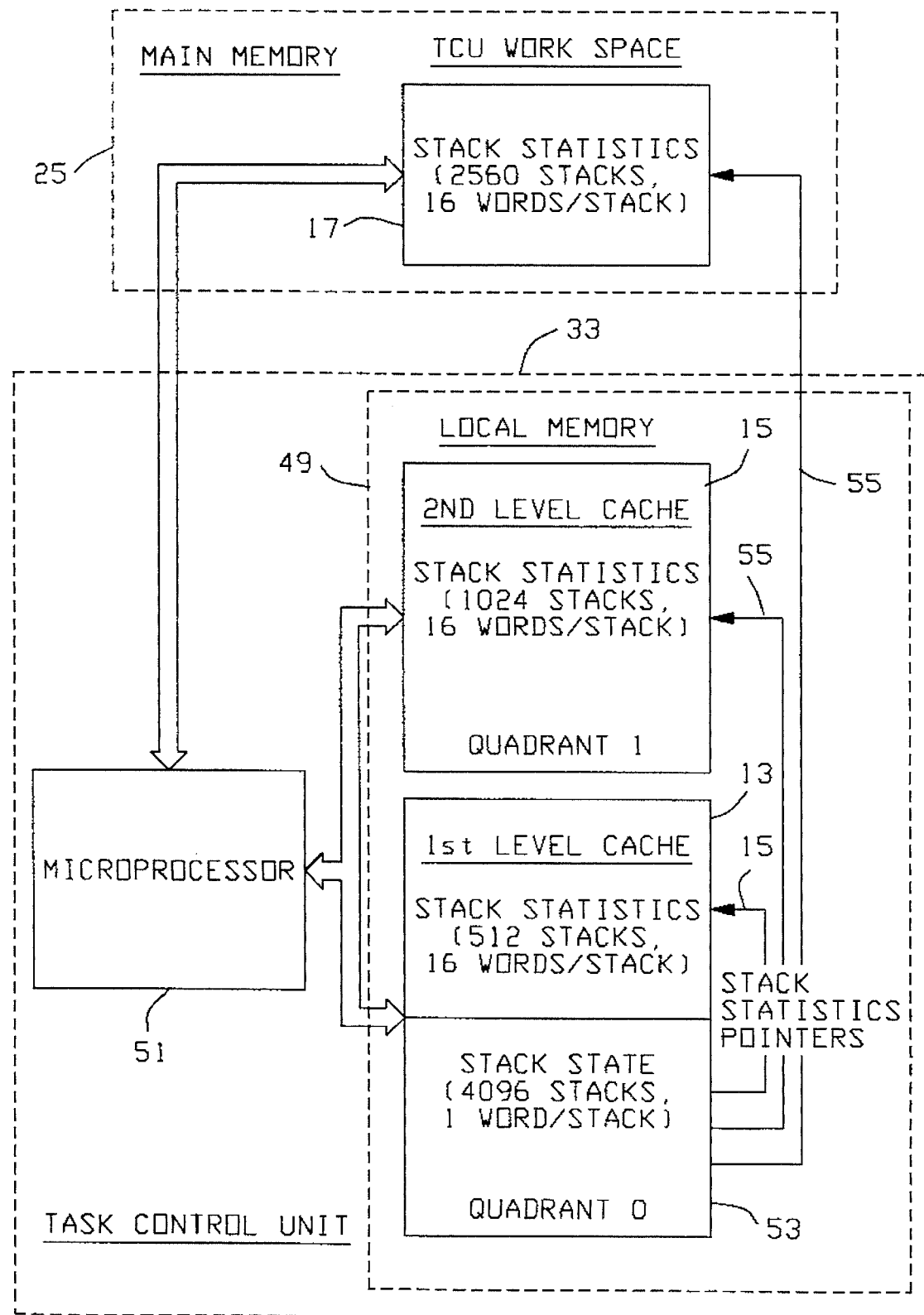
FIG. 3 is a block diagram of memory allocation in the configuration of FIG. 2.

Referring to FIG. 3, the TCU 33 provides access to two hardware memory structures: system main memory 25, which is located on a board different from the TCU 33, and TCU local memory 11 which is located on the same board as the TCU 33. Data access time to system main memory 25 is twenty 16 megahertz clocks for a word of data. TCU local memory 11 is subdivided into four quadrants. Data access time to TCU local memory quadrant 0 (first level memory 13) is two 16 megahertz clocks for a word of data, while data access time to quadrants 1 through 3 (second level memory 15) is ten 16 megahertz clocks for a word (¼ page) of data. The A19 TCU 33 function allocates three memory structures for the purpose of maintaining stack attributes. The first memory structure is an 8K (8192) by 54 bit work space located in quadrant 0 (first level memory 13) of TCU local memory 11. The second level memory 15 is a 16K work space located in quadrant 1 of TCU local memory 11. The third level memory is a 64K word work space which is located in system main memory 25. The third memory structure will hereafter be referred to as TCU dedicated main memory 17.

Ideally, the data which is used most frequency by the TCU 33 function will be maintained in the first level memory 13 because of the small data access time required. Correspondingly, the data which is least frequently used by the TCU 33 function will be maintained in TCU dedicated main memory 17. The data which is neither most nor least frequently used by the TCU 33 function is located in the second level memory 15.

Some terms used herein will now be defined. Stack attributes are state items which are maintained by the TCU 33 in memory structures for the purpose of implementing the task scheduling functions. For example, the TCU 33 maintains the following stack attributes or stack state: current priority, expiration time, an interrupt parameter, last alive time, last ready time, last waiting time, original priority, process time, ready time, two return parameters, and seven wait links. A slot is a memory construct which represents a container of state. For the following discussion, a slot is a 16 word by 54 bit block which contains link pointers, which are necessary to support the slot queue functions, and also contains stack state. The Empty queue 61 is a singly linked list of empty slots. An empty slot is a slot which does not contain a valid state; the state contained therein may be zero, or it may be an old stack state. The significance of the Empty queue 61, specifically the availability of empty slots, is that an empty slot may be used immediately upon selection without having to return (e.g. to TCU dedicated main memory 17) the state contained within the empty slot, since the empty slot contains no such usable state. The Empty queue head 65 is the pointer which identifies the first empty slot in the Empty queue 61. An Empty queue head 65 equal to zero indicates that there are no slots associated with the Empty queue 61, i.e., the Empty queue 61 is empty. An empty slot contains a forward link pointer which indicates the next empty slot in the Empty queue 61. An Empty queue 61 forward link pointer equal to zero indicates that the corresponding slot is at the tail 71 of the Empty queue 61. Empty slots are always selected, i.e., removed, from the head 65 of the Empty queue 61. Empty slots are selected from the Empty queue 61 using the following procedure, shown in pseudocode:

```
If Empty_Head NEQ 0 Then
    Selected_Slot <- Empty_Head
    Empty_Head <-Empty_Head.Forward_Link_Pointer
Endif
```

Note, the identifier '←' means "is assigned". Empty slots are inserted, i.e., returned, to the head 65 of the Empty queue 61. Empty slots are inserted into the Empty queue 61 using the following algorithm, shown in pseudocode:

```
Inserted_Slot.Forward_Link_Pointer <-Empty_Head
Empty_Head <-Inserted_Slot
```

The Available queue 63 is a doubly linked list of available slots. An available slot is defined to be a slot which contains valid stack state. The significance of the Available queue 63, specifically the method used to maintain this queue, is that the least recently used slots will be methodically filtered or moved up to the head 67 of this queue and ultimately replaced with more recently used stacks which do not already exist in this queue. The Available queue head 67 is the pointer which identifies the start of the Available queue 63. An Available queue head 67 equal to zero indicates that there are no slots associated with the Available queue 63, i.e., the Available queue 63 is empty. The Available queue tail 69 is the pointer which identifies the tail 69 of the Available queue 63. The Available queue tail 69 must be zero if the Available queue 63 is empty or an error has occurred. An available slot contains a forward link pointer which points to the next slot in the Available queue 63 and a reverse link pointer which points to the previous slot in the Available queue 63. An Available slot forward link pointer equal to zero indicates that the corresponding slot is at the tail 69 of the Available queue 63. An Available slot reverse link pointer equal to zero indicates that the corresponding slot is at the head 67 of the Available queue 63. An Available slot may be selected, i.e., removed, from anywhere within (head 67, middle or tail 69) the Available queue 63. Available slots are selected from the Available queue 63 using the following procedure, shown in pseudocode:

```
If Selected_Slot Available Head Then
    If Selected_Slot = Available_Tail Then
        Available_Head <- 0
        Available_Tail <- 0
    Else
        Available_Head <-Selected_Slot.Forward_Link_Pointer
        Forward_Slot.Reverse_Link_Pointer <- 0
    Endif
Else
    If Selected_Slot = Available_Tail Then
        Available_Tail <-Selected_Slot.Reverse_Link_Pointer
        Reverse_Slot.Forward_Link_Pointer <- 0
    Else
        Reverse Slot <-Selected_Slot.Forward_Link_Pointer
        Forward_Slot <-Selected_Slot.Reverse_Link_Pointer
    Endif
Endif
```

Available slots are always inserted, i.e. returned, to the tail of the Available queue 63. Available slots are inserted into the Available queue 63 using the following procedure, shown in pseudocode:

```
If Available Head = 0 Then
    Available_Head <- Inserted_Slot
```

```
        Available_Tail <-Inserted_Slot
        Inserted_Slot.Forward_Link_Pointer <- 0
        Inserted_Slot.Reverse_Link_Pointer <- 0
    Else
        Inserted_Slot.Forward_Link_Pointer <- 0
        Inserted_Slot.Reverse_Link_Pointer <- Available_Tail
        Available_Tail.Forward_Link_Pointer <- Inserted_Slot
        Available_Tail <- Inserted_Slot
    Endif
```

When a new slot is required and the Empty queue 61 is empty, i.e., there are no slots associated with the Empty queue 61, then a slot must be selected from the Available queue 63. As discussed above, the slot selected will be that at the head 67 of the Available queue 63. The data therein is stored at the tail 69 of the Available queue 63 in second level memory 15, and the new data to be added to first level memory 13 is moved to the tail 69 of the Available queue 63 for the first level memory 13.

The TCU 33 maintains the statistics of 512 events and the state for about 4K stacks. The TCU dedicated main memory 17 implementation provides "contended" memory access times to forty-one 16 megahertz clock cycle per page of data (23 clock cycles for the first word of a page and 6 additional clock cycles for each of the three successive words of the same page). In order to maintain performance, the TCU 33 implements a method which maintains the stack statistics for the 512 most recently used stacks in the TCU's first level memory 13. The first level memory 13 is a 16K word RAM with an access time of two 16 megahertz clock cycles per word. The method determines the least recently used stack and will return the stack state corresponding to the least recently used stack to second level memory 15 in favor of a more recently used stack. This method is a two queue, least recently used stack implementation. Each memory, first level memory 13 and second level memory 15, has two queues, the Empty queue 61 and the Available queue 63. For each of first level memory 13 and second level memory 15, the Empty queue 61 is a queue of "empty" slots (the current data contained in these slots is invalid). The Available queue 63 is a queue of "available" slots (the current data contained in these slots is valid and should be saved). When a stack is referenced by the TCU 33, the TCU 33 will check to see whether the corresponding stack statistics reside in the first level memory 13. If not, the TCU 33 will select an "empty" slot to localize stack statistics before any "available" slot would be so selected, because the data in an "empty" slot is invalid and therefore is not returned to TCU dedicated main memory 17. The TCU 33 will select an "available" slot to localize stack state if the "empty" slot queue has been exhausted (i.e., is empty).

The TCU 33 is preferably mounted on a printed circuit board. If that printed circuit board is also utilized for other purposes, then the amount of space available on the board to hold TCU local memory 11, consisting of first level memory 13 and second level memory 15, is limited. There is so much data that the TCU 33 needs to maintain in order to make the allocation decisions described above that the TCU 33 could only keep some of that data local in the TCU local memory 11. The rest is stored in TCU dedicated main memory 17. If data that is stored in TCU dedicated main memory 17 must be provided to the TCU processor 51, and if the Empty queue 61 is empty, then the least recently used stack in first level memory 13 (at the head 67 of the Available queue 63) is removed from that memory and put in second level memory 15, and the needed information from TCU dedicated main memory 17 is inserted into first level memory 13, so that the TCU 33 has the information that it needs in order to continue its processing. While this store and fetch sequence is being performed, the TCU processor 51 must wait and cannot continue processing until the needed data becomes local (placed in first level memory 13). It is therefore desirable to minimize the number of transfers in and out of first level memory 13 to make local data that the TCU processor 51 needs for continued operation, since each such transfer slows down the operation of the TCU processor 51.

For this reason, the method of the present invention tries to keep local the data that the TCU processor 51 needs the most, to avoid fetching that data from TCU dedicated main memory 17. Although storage capacity in the TCU local memory 11 is limited, and available storage in TCU dedicated main memory 17 is comparatively significantly larger, it is too expensive to the system, in terms of delay, to keep getting data needed for processing from main memory. Roughly 20 clock cycles per word are needed for fetches from TCU dedicated main memory 17, compared with two clock cycles per word to access first level memory 13. Accordingly, the method of the present invention attempts to keep the data in first level memory 13 that the TCU processor 51 uses most frequently, and keeps the data that the TCU processor 51 does not need or uses least frequently out in TCU dedicated main memory 17. There will still be times that data fetches from TCU dedicated main memory 17 will be required, but it is preferred to make such fetches as infrequent as possible. A slot of stack state is needed for each stack that is to be processed by the central processor 21 (see FIG. 2). A first level memory 13 having a 16K word capacity can keep the stack statistics for 512 stacks in local memory two clock cycles away. Each slot of stack statistics for that example has 16 words per stack. If a total of 4K (4096) stacks total are to be maintained, the status of 512 of the most active such stacks are kept in local first level memory 13. However, for a relatively fast system with a high performance processor, such as the Unisys A19 computer, the system is capable of generating more than 512 stacks and rather complicated user applications. Therefore, such a system could have more active stacks and the 512 stack limit in first level memory 13 could be filled. For that situation, if all 512 local first level memory 13 slots are used, then it is necessary to go to second level memory 15, or eventually to the TCU dedicated main memory 17, for any of the other stacks that the system 19 is running and the TCU 33 is referencing. Accordingly, to save system 19 time and avoid processing delays, in the present invention the TCU 33 only operates on stacks whose status are in first level memory 13, and will swap out the stack that is least recently used (the oldest stack that has been referenced) and keep local the stacks that are most recently referenced. First level memory 13 and second level memory 15 each include two queues as described above in connection with FIG. 4. The first such queue is called the Empty queue 61. When the system 19 (FIG. 2) is initialized, all 512 first level memory 13 slots are in the Empty queue 61 of first level memory 13, and all 1024 second level memory 15 slots are in the Empty queue 61 of second level memory 15. That means that when the TCU 33 references the first stack after system 19 initialization, the TCU 33 goes to the Empty queue 61 of first level memory 13, pulls one of the slots (the head slot) out of that Empty queue 61, and modifies the stack status data in that slat. That slot is now associated with a stack, and the data it contains is critical. The TCU 33 needs to maintain that data now associated with that stack, so this slot is moved from the Empty queue 61 into the other queue, the Available queue 63. With a first level memory 13 Empty queue 61 having 512 slots available at initialization, 512 slots could be subsequently used to maintain stack statistics before first level memory 13 would run out of slots. Once all 512 empty slots of first level memory 13 have been transferred from the Empty queue 61 to the Available queue 63, so that first level memory 13 has now run out of empty slots, a decision now has to be made on the 513th stack reference. As discussed above, the TCU 33 always operates on TCU local memory 11, which is where first level memory 13 exists. A decision now has to be made as where to put the data for the 513th slot. As with the other 512 slots, this data is retrieved or obtained from TCU dedicated main memory 17. The contents of one of the 512 slots in first level memory 13 must now be transferred to second level memory 15 to make room for the new data. The slot whose data is to be so transferred is selected in the following manner. The slots in first level memory 13 are arranged in a first in/first out (FIFO) queue arrangement. The slot to be returned to second level memory 15 is one which has not been used longer than any of the other slots. The first of the 512 entries that took an empty slot will end up at the head 67 of this Available queue 63 if it has not been referenced since. The stack that has been referenced the least recently is pushed out to second level memory 15, and the 513th data item is placed in that stack's former slot in first level memory 13. That slot is then taken out of the head 67 of the Available queue 63 and is moved to the tail 69 of the same Available queue 63 in first level memory 13, since it is now the most recently used slot. As a result, the next least recently referenced slot is now at the head 67 of the first level memory 13 Available queue 63. For the 514th stack, the second stack referenced is now at the head 67 of the first level memory 13 Available queue 63, and that stack is moved to second level memory 15 and is replaced in that slot with the content of the 514th stack referenced. This newly added stack is then moved to the tail 69 of the first level memory 13 Available queue 63 as the new most recently referenced stack. In this manner, the stacks keep filtering up to the head 67 of the Available queue 63 as they become less recently used. However, there are certain operations that the TCU 33 performs in which the stack so operated on is removed from wherever it is in the first level memory 13 Available queue 63 and is moved to the tail 69 of the first level memory 13 Available queue 63 and is thereby indicated as being the most recently used stack whether or not it is operated on at that time. For example, suppose that the first level memory 13 Available queue 63 has 512 stacks that are all in the Waiting state. These stacks cannot run on the central processor 21 because they are all waiting for data to be returned from system main memory 25 before they can run on the central processor 21 again. The stack at the head 67 of the first level memory 13 Available queue 63 is the least recently used stack in that cache. When the data associated with that stack that is needed to run again becomes local in system main memory 25, that stack is now able to run on the central processor 21 again and thereby transitions from the Waiting state to the Ready state so that it can be placed on the central processor 21 and enter the Alive state. While the central processor 21 is running on that stack, let us say that another task or job is then created. Since yet another stack has now been referenced, a place is needed to put that stack in first level memory 13. However, the head 67 of the first level memory 13 Available queue 63 is the stack that is currently on the central processor 21 and is therefore actually the most recently used stack. Nonetheless, the new stack would still be inserted by pulling out the slot at the head 67 of the first level memory 13 Available queue 63, returning the data contained in that slot to second level memory 15, and then pouring the new data into that slot, thereby replacing the stack that is currently running on the central processor or processors 21. When the central processor 21 is running on a stack, it issues messages or requests to the TCU 33 to maintain or change a particular state or statistic by reference to that stack. This refers not to the data that the central processor 21 is actually going to be operating on, but identifies or provides some characteristic of that data such as its priority. In older systems, the state would be stored by flip-flops or by registers, like Bryant et al. U.S. Pat. No. 4,008,460, but it is now preferably stored in RAM. For example, when the operating system through the central processor 21 sends a message to the TCU 33 to change the priority of a certain stack to 60, the TCU 33 goes to the slot for that stack. If that slot is local (i.e., in first level memory 13), then the TCU 33 modifies the state or statistic that is the priority for that stack. However, if that stack is not local (i.e., in first level memory 13), then the TCU 33 has to make that stack local and then change the data for that stack. If the first level memory 13 Available queue 63 is filled up with stacks, then one of these stacks would have to be replaced before the stack can be so modified.

In this example, there are 512 stacks all in Waiting status, with the stack at the head 67 of the Available queue 63 of first level memory 13 having been the least recently used but having just transitioned from Waiting status to Ready status (the data that that stack needed to run on the central processor 21 again became available in system main memory 25). The TCU 33 now instructs the central processor 21 to move on to this stack and begin executing it. The central processor 21 instructs the TCU 33 to create a new stack. Since all 512 slots in the first level memory 13 Available queue 63 are filled with data, one of these stacks has to be replaced to make room for the new stack. In first level memory 13 and in second level memory 15, the stack that is replaced is always the stack at the head 67 of the Available queue 63. In this example, the stack that is being replaced is the stack that is currently running on the central processor 21, and the stack data that is replaced is associated with the stack running on the central processor 21. Thus, the stack state associated with the stack running on the central processor is pushed out to second level memory 15, the newly created stack state is transferred into the slot, and the slot is moved to the tail 69 of the first level memory 13 Available queue 63. Since the stack that has just been placed in the second level memory 15 is the one that had been currently running on the central processor 21, this stack would then have to be retrieved from second level memory 15 when the stack is again referenced to continue the operation, necessitating swapping yet another stack from the head 67 of the Available queue 63 to second level memory 15 so that the stack previously swapped can be recovered and again made local. Obviously, this situation involves delay, waste of valuable time, and is undesirable.

A distinction should be made between the stack itself and the stack architecture. In the stack architecture, the central processor 21 deals with the stack. The stack is a combination of two things: program code, and data associated with the stack. The program code is the program code that the central processor 21 operates on. For instance, this code could be an ADD instruction. The data associated with this stack would then be the arguments of the ADD operation. However, with regard to the TCU 33, the stack data is not a combination of program code and associated data, but instead is data indicative or representative of state or statistics of the corresponding stack (e.g. Ready, Waiting, or Alive). The data that the TCU 33 maintains is the stack state and statistics, not an ADD instruction or the arguments associated with an ADD instruction as part of the program code. Instead, the data that the TCU 33 maintains is associated with the stack state and statistics, which define the state that the stack is in and its status. For example, the stack could be in Waiting state, meaning that the central processor 21 is not operating on the corresponding job or task, and that stack is suspended for whatever reason, and cannot run on the central processor 21. As another example, the stack could be in the Ready state, meaning that the corresponding job or task is able to run on the central processor 21. As another example, the stack state could be Alive, meaning that the job or task is currently running on the central processor 21. The stack state has nothing to do with the code stream operated on by the central processor 21 (as opposed to the TCU processor 51) and has nothing to do with the data that the code stream manipulates. In addition to the states of Ready, Waiting or Alive, the TCU 33 also maintains the priority of the stack as well as certain statistics concerning the stack. These statistics include how long the corresponding task has been running on the central processor 21, how long it has been waiting, or how long it has been ready. These are details about the stack that are not associated with the actual stack manipulation. The TCU 33 can decide based on some of this information to move a stack from a Waiting state to the Ready state and back onto the central processor 21. Central processor 21 would actually manipulate stack data, as opposed to TCU stack state. The stack state is the state that is maintained in slots in first level memory 13, second level memory 15 and TCU dedicated main memory 17. Each stack statistics entry contains 16 words per stack. However, not all of these stacks can be placed in TCU local memory. For this example, a total of 4096 stacks are used, of which 512 stacks can be kept in first level memory 13, 1024 stacks can be kept in second level memory 15 and the remaining 2560 stacks are kept in TCU dedicated main memory 17. At system 19 initialization, the state and statistics for all 4096 stacks are kept in TCU dedicated main memory 17, and are transferred to first level memory 13 and thence to second level memory 15 as needed. In the present invention, 512 of these stack entries can be kept local in a useful manner, because every time that a stack has to be referenced that is not in first level memory 13, it has to be localized (placed in first level memory 13) before the TCU 33 can operate on and change or update the stack state or stack attributes. In a pure FIFO arrangement, each stack would gradually filter to the head 67 of the Available queue 63 and would ultimately be replaced, as needed, after it reaches the head 67. In the first level memory 13, the TCU 33 can decide to move a slot associated with a stack down to the tail 69 of the Available queue 63. This gives that stack a better chance of being in first level memory 13 when the TCU 33 is going to reference that stack. References for a stack state from the operating system to the TCU 33 occur when the central processor 21 is currently running on the stack corresponding to that stack state in that slot. Therefore, whenever the central processor 21 is to run a particular stack or task, the TCU 33 now moves the corresponding stack state to the tail 69 of the first level memory 13 Available queue 63, indicating that it is the most recently used stack, because there is a very good possibility that the next operation issued by the central processor 21 to the TCU 33 will reference that stack. Otherwise, if that stack would be allowed to filter to the head 67 of the first level memory 13 Available queue 63, it could be swapped out to second level memory 15 or TCU dedicated main memory 17, only to have to be swapped back into first level memory 13 again very shortly thereafter.

Particularly with higher performance computer systems such as the Unisys A19 computer, the possibility exists with more complex applications that there will be more stacks used than the illustrative limit mentioned above of 512 stacks that can be maintained locally in first level memory 13. As a result, with such a system, it would be necessary to fetch stack statistics from TCU dedicated main memory 17 more frequently in order to maintain all those stacks above and beyond the above-described 512 stack limit. For this reason, in the present invention, the size of the TCU local memory 11 is increased (e.g. from 16K to 64K) to implement a second level memory 15. The first level memory 13 and the second level memory 15 are controlled in the manner shown in the flowchart of FIGS. 5A, 5B and 5C. Like the first level memory 13, second level memory 15 has both an Empty queue 61 and an Available queue 63. For example, for a total capacity of 4096 stack statistics of 16 words each, 1536 stack statistics could be stored in TCU local memory 11, of which 512 stack statistics could be stored in first level memory 13 and 1024 stack statistics could be stored in second level memory 15. The remaining 2560 stack statistics would then be stored in TCU dedicated main memory 17. Thus, statistics for 1536 stacks are kept local to the TCU 33, with the statistics for the other 2560 stacks being kept in TCU dedicated main memory 17. It takes longer for the TCU 33 to be provided with statistics for a stack from second level memory 15 than would so fetching statistics for a stack from first level memory 13, and accessing statistics for a stack from TCU dedicated main memory 17 would take still longer. For example, accessing for the TCU 33 data from first level memory 13 could take 2 clock cycles, accessing data from second level memory 15 could take 10 clock cycles and accessing data from TCU dedicated main memory 17 could take 20 clock cycles. Thus, second level memory 15 minimizes the number of main memory references needed. The second level memory 15 is not as close or as quickly accessible to the TCU 33 as is the first level memory 13, but it is not as far as is TCU dedicated main memory 17. Unlike first level memory 13, second level memory 15 is operated on a normal or unmodified least recently used, pure FIFO basis, wherein as a stack state becomes less recently used, it percolates to the head 67 of the Available queue 63. The stack statistics that is most recently used in second level memory 15 will start at the tail 69 and will gradually filter to the head 67 of the Available queue 63. Statistics for a stack that appears in one of first level memory 13, second level memory 15 and TCU dedicated main memory 17 does not appear in the other two of those; there is no duplication of data therein.

Figure 5A:
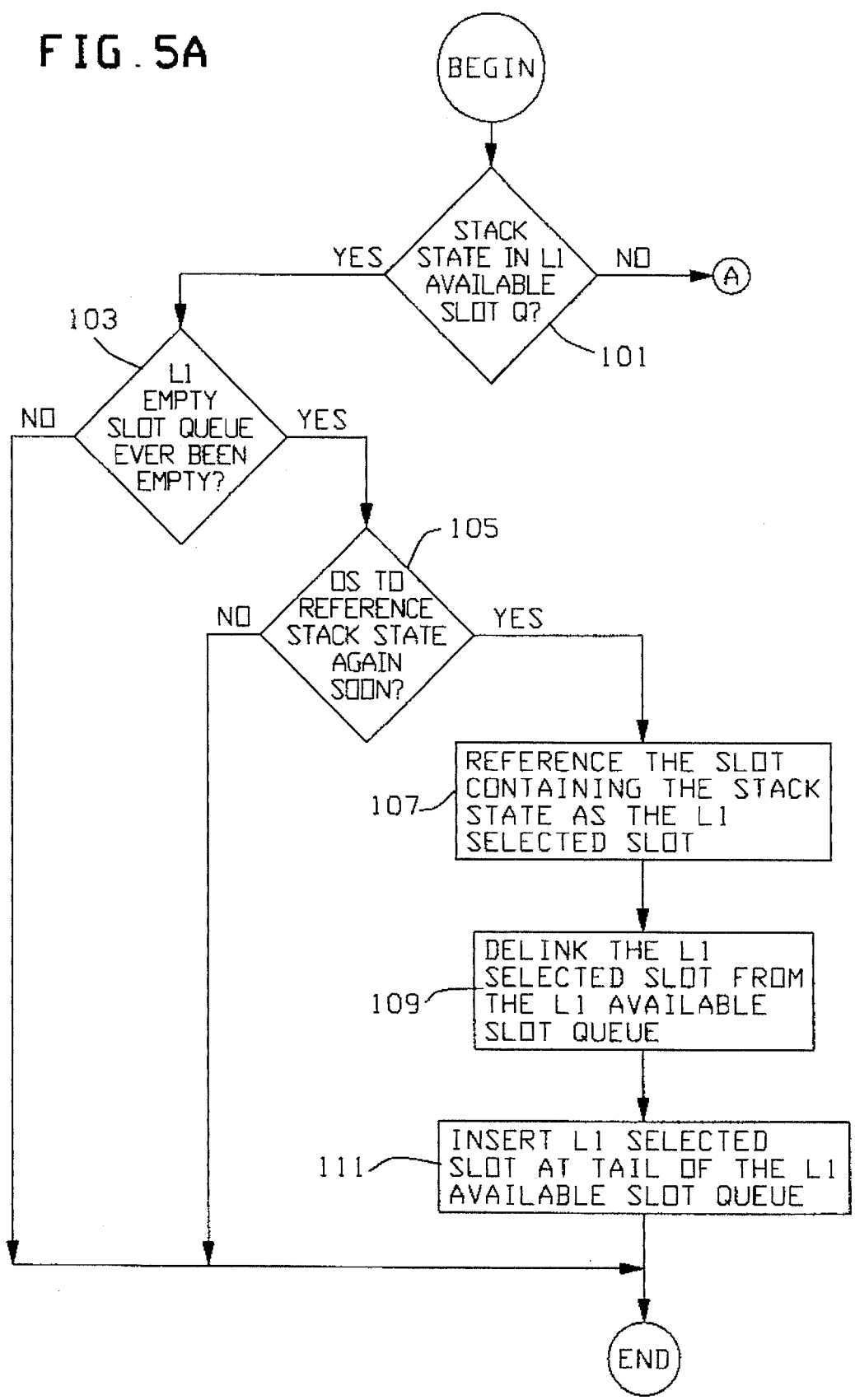
Figure 5B:
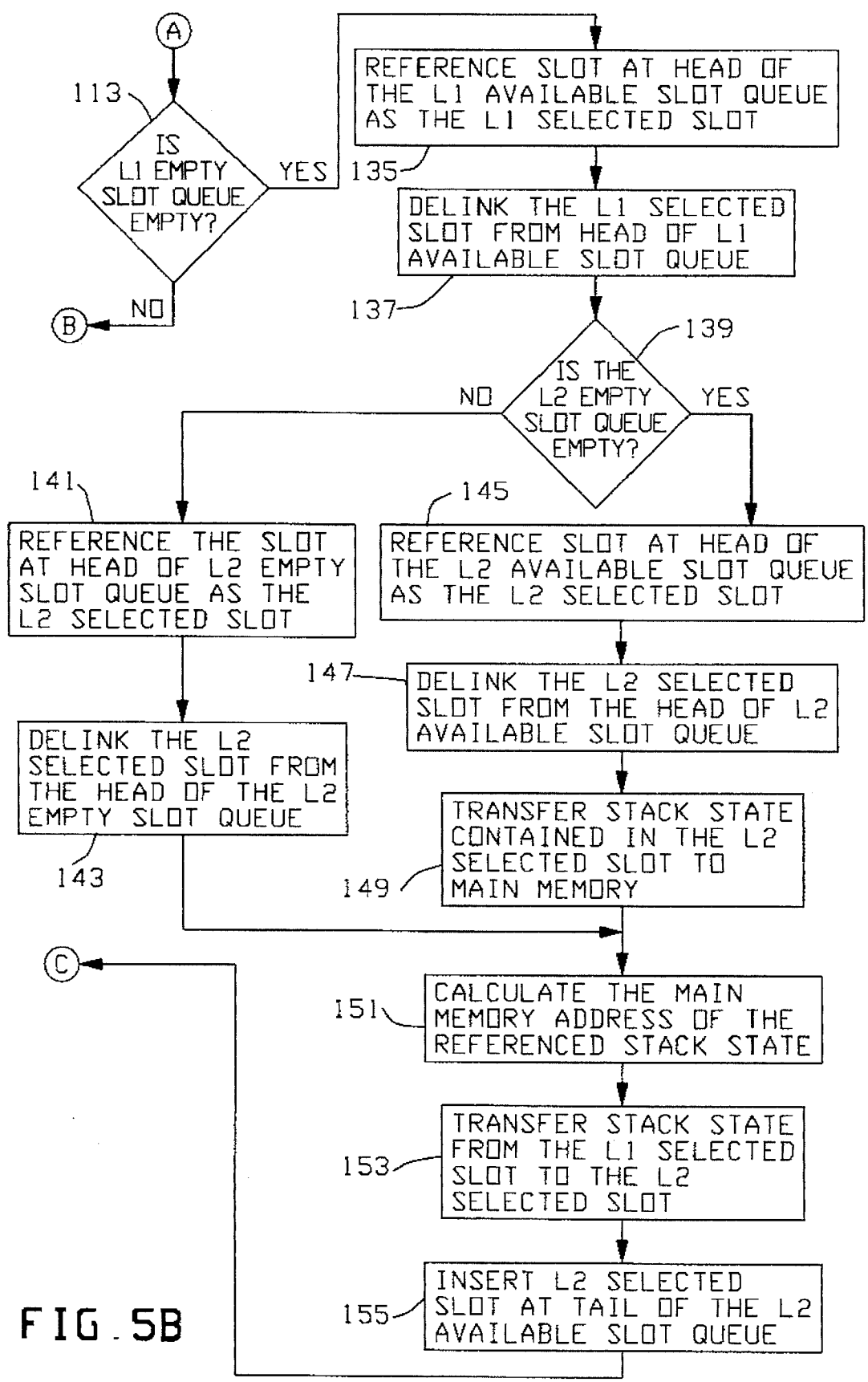
Figure 5C:
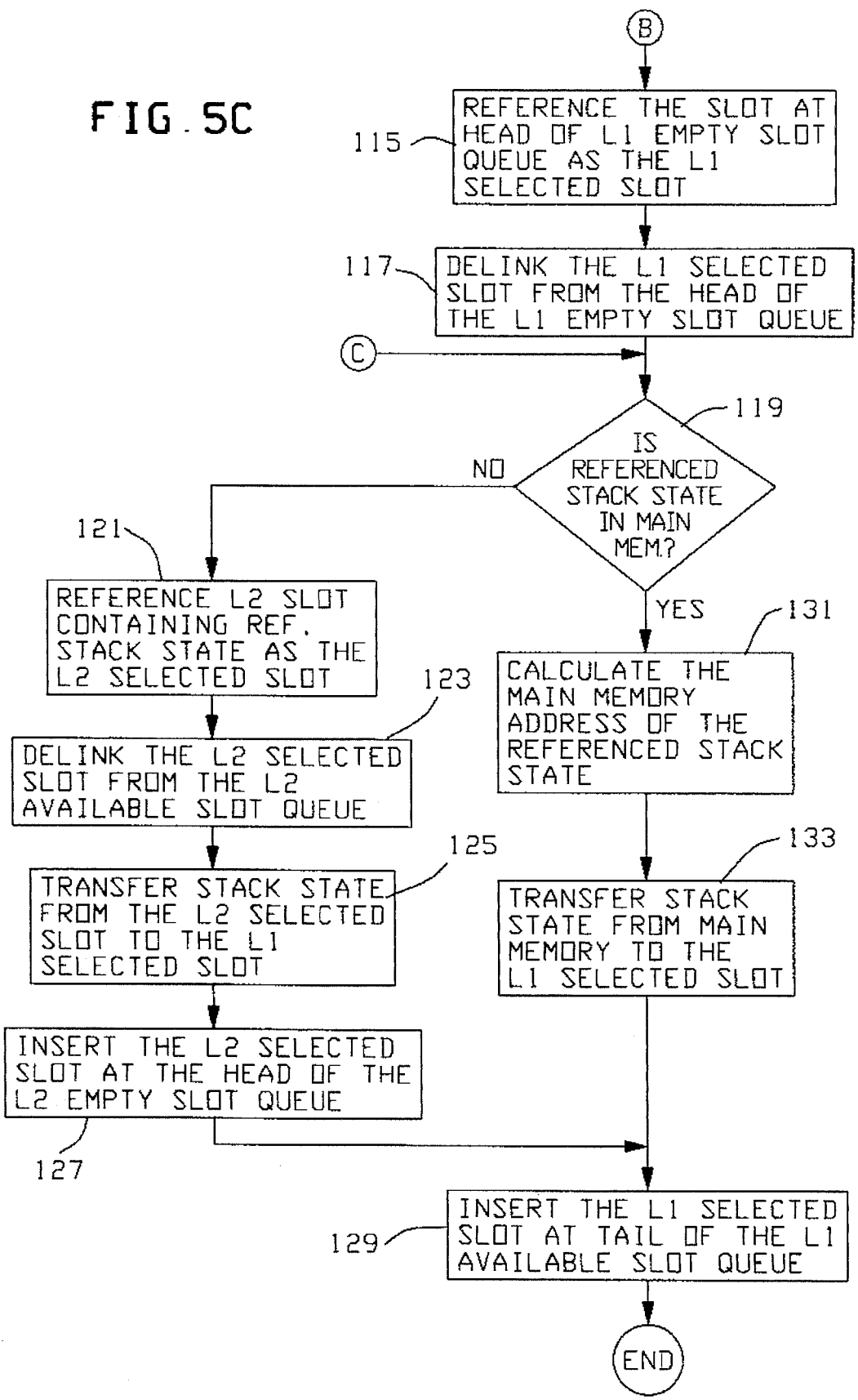

As shown in the flowcharts of FIGS. 5A, 5B, and 5C, it is advantageous at specific times to make sure that particular stack state data is held in TCU local memory 11 for data that is going to be referenced relatively often compared with other such data. Although in a pure FIFO or least recently used arrangement, the least recently used stack statistics data is sent to a less quickly accessible storage location to make room (if and as needed) for newly requested such data, nonetheless at times it is desirable to identify the status of a particular stack as most recently used and thereby keep it in first level memory 13. For example, one of the sixteen words within a slot has usage information for the corresponding stack or task, e.g. how much time that stack or task spends on the central processor 21. When the central processor 21 is told to operate on a stack, the processor time statistic is kept indicating how long that task has been running, and this is a piece of state that the TCU 33 maintains. This state statistic is updated by the TCU 33 when the central processor 21 moves off of that stack. This state statistic cannot be modified unless the statistics for this stack is in a slot within the Available queue 63 of first level memory 13. On this basis, the TCU 33 can tag the stack state or statistics as being the most recently used, and move it to the tail 69 of the Available queue 63 of first level memory 13.

Also, after system 19 initialization, as the system 19 gets running there are not always 512 stacks running in the system. There could be more such stacks and there could be less. For example, if there are 256 stacks running in the system 19, and first level memory 13 can maintain stack statistics for 512 stacks, then 256 stacks are in the Available queue 63 of first level memory 13 and there are still 256 slots in the Empty queue 61 of first level memory 13. When a new stack is referenced by the central processor 21, the TCU 33 will pull a slot out of the head 65 of the Empty queue 61 of first level memory 13, fill that slot with data and move that slot to the tail 69 of the Available queue 63 of that cache. As long as the system 19 is running with a number of stacks less than the stack state or statistics capacity of first level memory 13, the ability to reorder the stack states and statistics in that cache is not important. If empty slots are available, then there is no reason to make a previously used stack the most recently used stack, or to move a previously used stack to the most recently used Available queue 63 position, because that stack will not be swapped out, since there are still empty slots available for use. In those situations where all slots of the Available queue 63 of first level memory 13 have not been filled with valid stack state or statistics, a stack need not be moved to the tail 69 of the Available queue 63 to keep that stack in that queue. It is not until all slots in the Available queue 63 of first level memory 13 become actually used that a slot need be moved to the tail 69 of that queue from elsewhere in that queue. Accordingly, a flag is provided by the TCU 33 to indicate whether all available slots in first level memory 13 are in use. As that threshold is reached or exceeded, such as during peak usage, the TCU 33 LRU algorithm is enabled. Some stacks are removed entirely from the system 19 and do not exist forever because after the corresponding job or task has been completely run, those stacks are no longer used. This leaves an empty slot available to the system 19. After the corresponding job has run from beginning to end and then is no longer to be used, the corresponding stack state and statistics then become irrelevant if that stack has been removed from the system 19. The TCU 33 clears the associated stack state and statistics for the stack no longer needed, and returns a slot that is no longer in use, associated with that stack, back to the Empty queue 61. This capability is particularly useful because, if all available slots in first level memory 13 have been provided with valid stack data, and then the stack data for an additional stack is referenced, it is then necessary to store the contents of a slot and bring the new stack statistics data in. This is a rather expensive and timeconsuming operation to perform, particularly in the example where 16 words per stack are being stored and 16 words are being fetched. If instead empty slots are available in the first level memory 13, meaning that the Available queue 63 of that cache is not full, then there is no need to swap stack data. Instead, if an empty slot is available, the needed stack state data is fetched, made local and placed in the empty slot, without any need to store elsewhere data that is already in that cache.

When a stack is just created, its statistics will go into an empty slot (if one is available) and that whole slot will be moved to the Available queue 63. However, if there are no more empty slots in first level memory 13, then one of the filled slots in that cache will have to be replaced. It is considerably more expensive to store the 16 word content of the slot to be so used, and to fetch the needed data to be provided to that slot, than it is to only fetch the needed 16 words to be provided to an empty slot. For this reason, if it is known that a stack that has been processed will no longer be needed, then once that stack has been processed, it is preferred to clear the data from that slot, and then return the newly emptied slot to the Empty queue 61 of that cache. This procedure is preferred to a later stack data swap as the Available queue 63 of first level memory 13 becomes filled because clearing the slot is faster than a swap. Taking the time to clear a slot of unneeded data and to return that slot to the Empty queue 61 is faster than letting the available slots in the Available queue 63 fill up. In the latter situation, when a new stack is referenced, it is necessary to store one slot from that Available queue 63 and then fetch the newly referenced stack data. When a new stack is referenced, it is desirable to be able to reference that new stack quickly, in order to reduce processing time. Clearing a slot of unneeded stack data after that stack has been removed is by comparison in a relatively low performance scenario. For this reason, the TCU 33 periodically checks whether any empty slots are available in the first level memory 13, and whether any active stacks are then presently in second level memory 15. FIG. 7 illustrates return of slots to first level memory 13. If first level memory 13 has an empty slot, and an active stack is then presently in second level memory 15, it is preferable and advantageous to bring that active stack data to first level memory 13 using that empty slot. Stacks usually run very quickly, on the order of milliseconds. When this check for any first level memory 13 empty slots is performed is a function of time. Of course, if there is more than one active stack in second level memory 15, and first level memory 13 has more than one empty slot, then more than one active stack can be localized by placing it in the first level memory 13. If all active stacks are now placed in first level memory 13, there is no longer a need to move a stack from the middle of the Available queue 63 of first level memory 13 to the tail 69. In that situation, the TCU 33 is then informed that there is no need for such rearrangement of the first level memory 13 Available queue 63 because of the above-mentioned flag indicating whether any empty slots are available. Although it would be optimal for processing speed to have in the first level memory 13 all of the stacks that the TCU 33 will reference, this may not be feasible due to the limited capacity of that cache. If the number of active stacks exceeds the capacity of the first level memory 13, it is preferred that all of the stacks that are to be referenced are either in the first level memory 13 or the second level memory 15, and that the stacks that are referenced most frequently are in the first level memory 13. To do so, the relative order of stack data in the Available queue 63 of first level memory 13 is rearranged based on both actual use and on anticipated use, as described above, when this flag indicates that the first level memory 13 is filled. If this flag indicates that the first level memory 13 is not filled, then stacks that are in the second level memory 15 are moved to empty slots in the first level memory 13, to the extent of the available capacity of the first level memory 13. If the first level memory 13 is not full, there is no need to remove the least recently used stack from the cache, and therefore no need to rearrange the cache. To summarize: Any time that a stack is currently being operated on by the central processor 21, that stack will be pulled out of its present location and will be put at the tail 69 of the Available queue 63 of first level memory 13, if all available locations on that cache have been filled. If the first level memory 13 has not been filled, a used stack in the first level memory 13 will remain where it is. Once first level memory 13 becomes filled, while it remains filled, the order of a stack in the Available queue 63 of that cache is rearranged as that stack is used.

Figure 2:
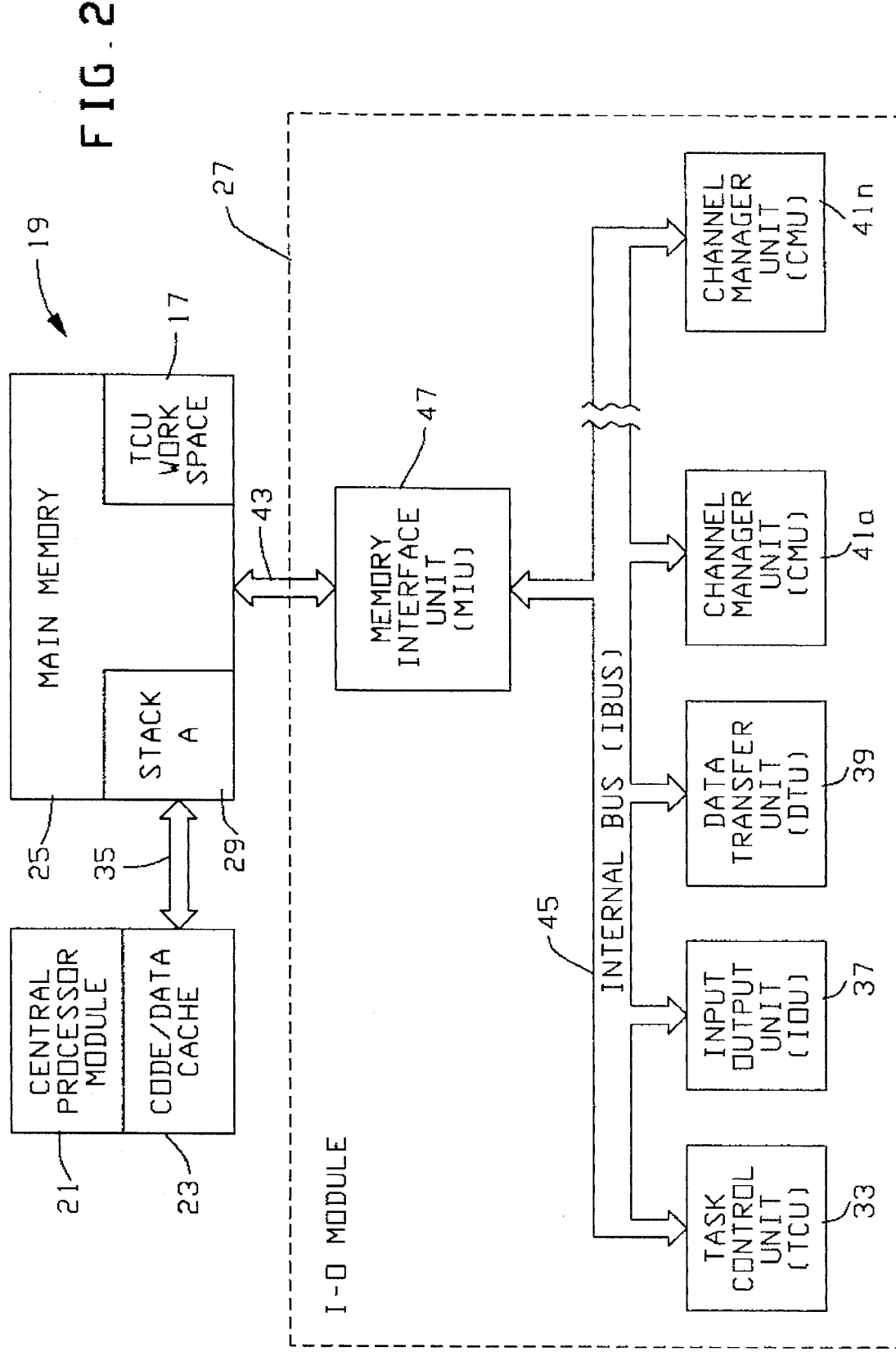
FIG. 2 is a block diagram of a processing configuration utilizing the data allocation and storage configuration of FIG. 1.

FIG. 2 shows one example of a general computer system configuration 19 in which the present invention could be advantageously used. FIG. 3 shows a preferred embodiment of allocation of memory for stack statistics and stack state according to the present invention. System 19 includes a central processor 21 with an associated local code/data cache 23, system main memory 25 and input/output (I/O) module 27. There is defined in system main memory 25 a stack A 29 for the central processor 21, and a TCU work space 31 for task control unit (TCU) 33. Code and data is provided between code/data cache 23 and stack A 29 for the central processor 21 via bus 35. Code and data is provided between system main memory 25 and I/O module 27 via bus 43. System main memory 25 is accessed by direct mapping, e.g. addressing. I/O module 27 includes several units, including task control unit, TCU 33, input/output unit 37, data transfer unit 39 and several channel manager units 41a–41n. These units communicate with system main memory 25 via internal bus 45, memory interface unit 47 and bus 43. Thus, task control unit, TCU 33, must compete with several other units 37, 39 and 41 to access sytem main memory 25. For this reason, it is desirable to provide TCU 33 with its own local memory 49. However, space limitations limit the size of local memory 49, and the demands of the central processor 21 necessitate that TCU 33 utilize a larger amount of memory than can be conveniently stored with TCU 33. For this reason, a TCU dedicated main memory 17 is defined in system main memory 25. FIG. 3 illustrates allocation of memory for stack statistics. As shown in FIG. 3, TCU 33 includes local memory 49 and TCU processor 51. Local memory 49 includes stack state memory 53, first level memory 13 and second level memory 15. Stack state includes one word for each of the 4096 stacks of first level memory 13, second level memory 15 and TCU dedicated main memory 17. For each such stack state word, there is a pointer 55 that points to the corresponding stack statistics in first level memory 13, second level memory 15 or TCU dedicated main memory 17. As the location of stack statistics changes, the position of the corresponding pointer correspondingly changes also. As shown in FIG. 3, TCU processor 51 is provided with three levels of memory. The TCU 33 has with it TCU local memory 11 including first level memory 13 and second level memory 15. Relatively speaking, as shown in FIG. 2, TCU dedicated main memory 17 is far away in system main memory 25, and TCU 33 is in contention with other I/O module units 37, 39, 41 on internal bus 45 to access system main memory 25. The central processor 21 runs the code stream, stacks, user code, programs, jobs, etc. When the central processor 21 is to run a code stream from disk, a portion of the program is brought into system main memory 25 at stack A 29, and a portion of same goes to the central processor's 21 own local memory 23. Afterwards, as needed, the central processor 21 fetches another portion from stack A 29 for its local memory 23. However, the central processor 21 only executes what is then in its local memory 23. For example, for a program and data on disk or tape, about half can be provided to system main memory 25 at stack A 29, because of memory space limitations, and central processor local memory 23 is even smaller for the same reason. FIG. 2 provides a general overview of where the central processor 21, TCU 33 and TCU dedicated main memory 17 are located in a general computer system 19. A stack state in local memory area 53 includes whether the corresponding stack is Waiting, Ready or Alive in state, and maintains pointers 55 to where the corresponding stack statistics are located.

FIGS. 5A, 5B and 5C together show a stack state reference flowchart according to the present invention. The TCU 33 task scheduling and event control functions will enter this flow whenever stack state is to be referenced by the corresponding TCU 33 task scheduling and event control function. In those figures, "L1" refers to the first level memory 13, and "L2" refers to the second level memory 15. When the TCU 33 seeks to access stack information, it is first determined at step 101 whether the desired stack state is located in the Available queue 63 of the first level memory 13. If so, then TCU processor 51 can access the sought information directly from first level memory 13. It is then determined at step 103 whether the Empty queue 61 of first level memory 13 has ever been empty, which would indicate that the Available queue 63 of that cache had then been full. This information could be set by a flag separate from the above-described flag that indicates whether first level memory 13 is full at that particular time. If not, then nothing further need be done. However, if first level memory 13 had ever been full, then at step 105 it is next determined whether the TCU processor 51 is likely to reference this requested stack state again soon. If not, then nothing further need be done. However, if this is a stack state or statistic that is likely to be referenced again soon, then at steps 107, 109 and 111 the slot containing that stack state or statistic is moved to the tail 69 of the Available queue 63, so that it appears to be the most recently used slot.

However, if at step 101 it is found from stack state storage 53 that the requested stack statistic is not in the Available queue 63 of first level memory 13, then at step 113 it is determined whether the Empty queue 61 of first level memory 13 is then empty, indicating that the first level memory 13 is then full. If not, then at steps 115 and 117 a slot is removed from the head 65 of the Empty queue 61 of first level memory 13, to be used for the data to be provided to that cache for use by TCU processor 51. Thereafter, at step 119 it is determined whether the stack state or statistics being accessed by TCU processor 51 is located in TCU dedicated main memory 17. If not, indicating that the stack state or statistics being accessed is in second level memory 15, then at steps 121, 123, 125 and 127 the slot of second level memory 15 containing the requested stack information is moved to the new first level memory 13 slot produced by steps 115 and 117, and then the newly emptied second level memory 15 slot is moved to the head 65 of the Empty queue 61 of the second level memory 15. Thereafter, at step 129, the newly filled slot of first level memory 13 is moved to the tail 69 of the Available queue 63 of that cache, making it available for access by TCU processor 51. However, if at step 119 it is found that the referenced stack state or statistics is in TCU dedicated main memory 17, then at step 131 the address of the TCU dedicated main memory 17 location containing the referenced stack information is determined, and at subsequent step 133 the information at that address in TCU dedicated main memory 17 is transferred to the first level memory 13 slot prepared by steps 115 and 117. Thereafter, at step 129 that slot is placed at the tail 69 of the Available queue 63 of first level memory 13, thereby making the requested stack information available to TCU processor 51.

However, if at step 101 the stack state or statistic sought by TCU processor 51 is not in the Available queue 63 of first level memory 13, and if at step 113 the Empty queue 61 of that cache is presently empty (indicating that the first level memory 13 is then full), then a stack swap is necessary to place the requested stack information into the first level memory 13. To do so, at steps 135 and 137, the slot at the head 67 of the Available queue 63 of first level memory 13 is selected and delinked for such swapping. Then, at step 139 it is determined whether the Empty queue 61 of second level memory 15 is empty, which would indicate that second level memory 15 is also presently full. If not, then the slot presently at the head 65 of the Empty queue 61 of second level memory 15 is selected to receive the stack data to be swapped out of first level memory 13 at steps 141 and 143. Otherwise, if second level memory 15 is full, then instead at steps 145, 147 and 149 the slot at the head 67 of the Available queue 63 of second level memory 15 is instead so selected and its contents transferred to TCU dedicated main memory 17. In either manner, a slot is made available in second level memory 15 to which the data in the slot at the head 67 of the Available queue 63 of first level memory 13 can be transferred. Next, the stack state information from the head 67 of the Available queue 63 of first level memory 13 is transferred to the second level memory 15 slot selected by step 141 or step 145, and then at step 155 that newly filled slot from the second level memory 15 is placed at the tail 69 of the Available queue 63 of the second level memory 15. After step 155, the process then goes to steps 119 et seq., described above, which transfer the requested stack data to a slot of first level memory 13.

FIG. 6 is a flowchart that describes how slots are returned to the first level memory 13 Empty queue 61. The TCU 33 function will enter this flow whenever the operating system instructs the TCU 33 to remove a stack from the TCU's task scheduling algorithm. When the TCU 33 is instructed to remove a stack from the task scheduling algorithm the operating system is telling the TCU 33 that it does not expect to rereference the stack until it is reinserted into the TCU's task scheduling algorithm. As a result the TCU 33 returns the corresponding stack state to system main memory 25. In order to return stack state to system main memory 25 the TCU 33 establishes the slot that corresponds to the stack being removed, this is done in step 201. Next the TCU 33 removes the slot from the first level memory 13 Available queue 63, step 203. The TCU 33 then calculates the system main memory 25 address that corresponds to the stack being removed (step 205) and transfers the data from the slot to system main memory 25 beginning at the calculated main memory address (step 207). The empty slot is then inserted at the head 67 of the first level memory 13 Empty queue 61.

FIG. 7 is a flowchart that describes how slots are returned to the first level memory 13 Available queue 63 from the second level memory 15 Available queue 63. The purpose of this function is to optimized the performance of the TCU 33 by localizing as much of the stack state as possible in the first level memory 13. The TCU 33 periodically initiates the process described in FIG. 7. Before any stack state can be transferred from the second level memory 15 to the first level memory 13 the TCU 33 must determine whether, or not, any first level memory 13 empty slots exist. To determine this the TCU 33 checks the first level memory 13 Empty queue 61 to see if it is empty or not (step 301). If the first level memory 13 Empty queue 61 is empty then all of the slots reside in the first level memory 13 Available queue 63 and transferring stack state from the second level memory 15 Available queue 63 to the first level memory 13 Available queue 63 would not occur. However, if the first level memory 13 Empty queue 61 is not empty then it would be advantageous to transfer stack state from the secdnd level memory 15 Available queue 63 to the first level memory 13 Available queue 63. If the first level memory 13 Empty queue 61 is not empty then the TCU 33 must determine whether, or not, any second level memory 15 available slots exist. To determine this the TCU 33 checks the second level memory 15 Available queue 63 to see if it is empty or not (step 303). If the second level memory 15 Available queue 63 is empty then there are no stack states in the second level memory 15 and all of the second level memory 15 slots reside in the second level memory 15 Empty queue 61. However, if the second level memory 15 Available queue 63 is not empty then it would be advantageous to transfer stack state from the second level memory 15 Available queue 63 to the first level memory 13 Available queue 63. Having met the conditions described above (i.e., neither the first level memory 13 Empty queue 61 nor the second level memory 15 Available queue 63 is empty) the TCU 33 selects (step 305) and removes (step 307) the slot at the head 65 of the first level memory 13 Empty queue 61, and, selects (step 309) and removes (step 311) the slot at the tail 69 of the second level memory 15 Available queue 63. The TCU 33 then transfers the stack state from the second level memory 15 slot to the first level memory 13 slot (step 313). Once the stack state is transferred from one slot to the other, the TCU 33 inserts the first level memory 13 slot at the head 67 of the first level memory 13 Available queue 63 (step 315) and inserts the second level memory 15 slot at the head 65 of second level memory 15 Empty queue 61. This process continues until either the first level memory 13 Empty queue 61 or the second level memory 15 Available queue 63 becomes empty.

The method of FIGS. 5A, 5B and 5C can be implemented in microcode or firmware. An example of such microcode or firmware implementing the method of FIGS. 5A, 5B, and 5C, written in the ABADABA language of Unisys Corporation, is given below and in the following pages.

```
PRST WORD SELECTION CONSTANTS
---- ---- --------- ---------
    CPRI_SLINK                  = 1;
    LAST_RDY                    = 0; Requires special handling
    VISITS                      = 2;
    LAST_WTG                    = 3;
    PRO_EV_CRSE_EX_TIME         = 4;
    P2_MX_PR_T                  = 5;
    WLINK_WORD_0                = 6;
    WLINK_WORD_1                = 7;
    WLINK_WORD_2                = 8;
    WLINK_WORD_3                = 9;
    WLINK_WORD_4                = 10;
    WLINK_WORD_5                = 11;
    WLINK_WORD_6                = 12;
    OWNER_STK                   = 13;
    RTN_1_PR_T                  = 14;
    RTN_2_RDY_T                 = 15;

ASSOC. PRST CONSTANTS
------ ---- ---------
    LOCAL_WAIT_C                = H'7';
    PRST_TBL_BASE               = H'1000';
    PRST_TBL_TOP                = H'3FFF';
    STK_BLK_SIZE                = H'10';
    STK_ZEROS_SLOT              = H'100'; = H'1000' in H/W

EXT PRST CONSTANTS
------ ---- ---------
    EXT_SLOT_BASE               = H'0000';

PR STATE FIELD DEFINITIONS
-- ----- ----- -----------
    CLASS[51..48]
    TQ_LINK[47..47]     This process has a Time Table entry
    SUPER_ST[46..45]
    BLKD[46..46]
    STATE[44..43]
    SUB_ST[42..40]
    INT[39..39]
    RTN[38..38]
    DSED[37..37]
    DSABLE_WT[36..36]
    HELD_STK[35..35]    This process is HELD
    PREF_STK[34..34]    This process is PREFERRED
    PF_CPM[33..31]      Preferred CPM# if process is PREFERRED
    PR_CPM[30..28]      CPM# that process is (or last was) on
    PQFL[27..14]        Adr of Waiting to PROCURE forward link
    RQFL[27..14]        Adr of READY QUEUE forward link
    WAIT_DETAILS[27..14] Simple Wait performance feature
    WAIT_RST_OPT[27..27]
    WAIT_C[21..14]      Wait Count - # of evnts being waited on
```

```
        PRST_PTR_EX[13..2]    Pointer into word-0 of PRST in EXT_LM
        IN_EXT_LM[1..0]       field used to indicate if in EXT_LM
        PRST_PTR[13..0]       Adr into Word-0 of assoc PRST Table s]

PRST STATE FIELD DEFINITIONS
---- ----- ----- -----------

CPRI_SLINK
        ----------
        CPRI[47..28]
        CPRI_BASE[47..34]
        CPRI_FINE[33..28]
        LAST_ALIVE[23..0]
        SLOTQ_LINKS[27..0]
        SLOT_RLINK[27..14]
        SLOT_FLINK[13..0]

PRO_EV_CRSE_EX_TIME
        -------------------
        PRO_EV[47..29]
        PRO_CRSE_EX_TIME[28..0]

P2_MX_PR_T
        ----------
        P2_ACK[47..47]
        P2_LST[46..40]
        P2[47..40]
        MX_PR_T[39..0]

WLINK_WORD_X
        ------------
        RLINK_47_24 [47..24]
        RLINK_STATUS_46 [46..46]
        R_EVP[44..44]
        RWLINK[43..24]
        R_PS[43..36]
        R_PN[35..24]
        FLINK_23_00 [23..00]
        FLINK_STATUS_22 [22..22]
        F_EVP[20..20]
        FWLINK[19..0]
        F_PS[19..12]
        F_PN[11..0]

OWNER_STK
        ---------
        OHEAD[47..28]
        OPRI_BASE[27..14]
        SLOT_STK[13..0]

RTN_1_PR_T
        ----------
```

```
    RTN_1[47..40]
    PR_T[39..0]

RTN_2_RDY_T
    ----------
    RTN_2[47..40]
    RDY_T[39..0]

FETCH_SLOT_ADR      : WORD_TYPE; FETCH_SLOT_FROM_MM
I_PAGE              : INTG_TYPE; STORE_SLOT_TO_MM
I_PAGE_LM           : INTG_TYPE; STORE_SLOT_TO_MM
I_PAGE_MM           : INTG_TYPE; STORE_SLOT_TO_MM
LM_ADR              : WORD_TYPE;
EXT_LM_ADR          : WORD_TYPE:
LST_CRSE_TIME       : WORD_TYPE;
NUM_EVENTS          : WORD_TYPE; NUMBER OF EVENTS
PRG_PRI             : WORD_TYPE; DELINK_PRG_PROC
EXT_STATUS_WORD     : WORD_TYPE; Flag to tell us if we have 64k RAM
SLOTQ_AHD_EXT       : WORD_TYPE; Head of the ext. available slot Q
SLOTQ_ADR           : WORD_TYPE; SLOTQ_SELECT
SLOTQ_ADR_EXT       : WORD_TYPE; SLOTQ_SELECT
SLOTQ_NUM_EXT       : WORD_TYPE; SLOTQ_SELECT_EXT
SLOT_ATL            : WORD_TYPE; Tail of the available slot queue
SLOTQ_ATL_EXT       : WORD_TYPE; Tail of the available slot queue
SLOTQ_EHD           : WORD_TYPE; Head of the empty slot queue
SLOTQ_EHD_EXT       : INTEGER; Head of the ext. empty slot queue
SLOTQ_FLINK         : WORD_TYPE; SLOTQ_AQ_DELINK
SLOTQ_FL_EXT        : WORD_TYPE;
SLOTQ_PTOK          : WORD_TYPE; SLOTQ_MASTER
SLOTQ_RLINK         : WORD_TYPE; SLOTQ_AQ_DELINK
SLOTQ_RL_EXT        : WORD_TYPE;
STORE_SLOT_ADR      : WORD_TYPE; STORE_SLOT_TO_MM
STORE_SLOT_STK      : WORD_TYPE; STORE_SLOT_TO_MM
```

PROCEDURES USED IN THE LEAST RECENTLY USED (LRU) ALGORITM.
- PROCEDURE SLOTQ_AQ_DELINK;
- PROCEDURE SLOTQ_AQ_DELINK_EXT;
- PROCEDURE SLOTQ_MASTER;
- PROCEDURE SLOTQ_MASTER_EXT;
- PROCEDURE SLOTQ_NEW_ATAIL;
- PROCEDURE SLOTQ_NEW_ATAIL_EXT;
- PROCEDURE SLOTQ_NEW_EHEAD;
- PROCEDURE SLOTQ_NEW_EHEAD_EXT;
- PROCEDURE SLOTQ_SELECT;
- PROCEDURE SLOTQ_SELECT_EXT;
- PROCEDURE SLOTQ_WIZARD;
- PROCEDURE SLOTQ_AQ_DELINK;

```
    PROCEDURE SLOTQ_AQ_DELINK;

*****************************************************************
The purpose of this procedure is to delink a slot from the available
slot queue.
*****************************************************************

BEGIN

SLOTQ_FLINK := LM[SLOTQ_ADR].SLOT_FLINK;
    SLOTQ_RLINK := LM[SLOTQ_ADR].SLOT_RLINK;
    IF SLOTQ_AHD := SLOTQ_ADR THEN
       BEGIN
          SLOTQ_AHD := SLOTQ_FLINK;

IF SLOTQ_ATL = SLOTQ_ADR THEN
              SLOTQ_ATL := SLOTQ_RLINK

ELSE
              LM[SLOTQ_FLINK].SLOT_RLINK :=0;
       END

ELSE
       IF SLOTQ_ATL = SLOTQ_ADR THEN
          BEGIN
             SLOTQ_ATL := SLOTQ_RLINK;
             LM[SLOTQ_RLINK].SLOT_FLINK := 0
          END

ELSE
          BEGIN
             LM[SLOTQ_RLINK].SLOT_FLINK := SLOTQ_FLINK;
             LM[SLOTQ_FLINK].SLOT_RLINK := SLOTQ_RLINK;
          END;
END;      of procedure SLOTQ_AQ_DELINK

PROCEDURE SLOTQ_AQ_DELINK_EXT;

*****************************************************************
This procedure delink's slot at SLOTQ_ADR_EXT from the extended
available slot queue.
*****************************************************************

BEGIN

SLOTQ_FL_EXT := EXT_LM[SLOTQ_ADR_EXT].SLOT_FLINK;
    SLOTQ_RL_EXT := EXT_LM[SLOTQ_ADR_EXT].SLOT_RLINK;
    IF SLOTQ_AHD_EXT = SLOTQ_NUM_EXT THEN
       BEGIN
          SLOTQ_AHD_EXT := SLOTQ_FL_EXT;
```

```
        IF SLOTQ_ATL_EXT = SLOTQ_NUM_EXT THEN
            SLOTQ_ATL_EXT = SLOTQ_RL_EXT;

ELSE
            BEGIN
                EXT_LM_ADR := (SLOTQ_FL_EXT * STK_BLK_SIZE) + EXT_SLOT_BASE;
                EXT_LM[EXT_LM_ADR].SLOT_RLINK := H'3FFF';
            END;
    END

ELSE
    IF SLOTQ_ATL_EXT = SLOTQ_NUM_EXT THEN
        BEGIN
            SLOTQ_ATL_EXT := SLOTQ_RL_EXT;
            EXT_LM_ADR := (SLOTQ_RL_EXT * STK_BLK_SIZE) + EXT_SLOT_BASE;
            EXT_LM[EXT_LM_ADR].SLOT_FLINK := H'3FFF';
        END

ELSE
        BEGIN
            EXT_LM_ADR := (SLOTQ_RL_EXT * STK_BLK_SIZE) + EXT_SLOT_BASE;
            EXT_LM[EXT_LM_ADR].SLOT_FLINK := SLOTQ_FL_EXT;
            EXT_LM_ADR := (SLOTQ_FL_EXT * STK_BLK_SIZE) + EXT_SLOT_BASE;
            EXT_LM[EXT_LM_ADR].SLOT_RLINK := SLOTQ_RL_EXT;
        END;
END;           of procedure SLOTQ_AQ_DELINK_EXT PROCEDURE SLOTQ_MASTER;
*****************************************************************
The purpose of this procedure is to handle all of the details
required for slot selection and assignment
*****************************************************************

BEGIN

Locate a suitable slot for SLOTQ_PTOK's PRST
    SLOTQ_SELECT;
    LM[SLOTQ_PTOK].PRST_PTR := SLOTQ_ADR;

Localize SLOTQ_PTOK's PRST
    MM_ADR := (SLOTQ_PTOK * STK_BLK_SIZE);
    MM_ADR := MM_ADR + MM_STK_ADR_BASE;

NOTE: The Mcode will have to wait for the previous
    slot to return to main memory before SLOTQ_PTOK's PRST
    can be fetched from main memory.

Fetch SLOTQ_PTOK's PRST from main memory
    FETCH_SLOT_FROM_MM;
```

```
                Assign the Slot's new owner, SLOT_STK = SLOTQ_PTOK.
    LM [SLOTQ_ADR + OWNER_STK].SLOT_STK := SLOTQ_PTOK;

Link slot at the tail of the avail. slot queue
    SLOTQ_NEW_ATAIL;

END;        of procedure SLOTQ_MASTER

PROCEDURE SLOTQ_MASTER_EXT;
*****************************************************************
This procedure handles all of the details required for slot selection
and assignment in the extended slot queue.
*****************************************************************

BEGIN
                Locate a suitable slot for SLOTQ_PTOK's PRST
    SLOTQ_SELECT;

Localize SLOTQ_PTOK's PRST from extended lm

SLOTQ_NUM_EXT := LM[SLOTQ_PTOK].PRST_PTR_EX;

LM[SLOTQ_PTOK].PRST_PTR := SLOTQ_ADR;

Fetch SLOTQ_PTOK's PRST from extended local memory
    GET_SLOT_FROM_EXT_LM;

Assign the Slot's new owner, SLOT_STK = SLOTQ_PTOK.
    LM [SLOTQ_ADR + OWNER_STK].SLOT_STK := SLOTQ_PTOK;
                Link slot at the tail of the avail. slot queue
    SLOTQ_NEW_ATAIL;

END;        of procedure SLOTQ_MASTER_EXT

PROCEDURE SLOTQ_NEW_ATAIL;
*****************************************************************
    The purpose of this procedure is to insert the slot assoc.
w/ PTOK at the tail of the available slot queue.
*****************************************************************

BEGIN

SLOTQ_ADR.WORD := CPRI_SLINK;
    IF SLOTQ_AHD = 0 THEN
        BEGIN
                The queue is empty, link accordingly
        SLOTQ_AHD := SLOTQ_ADR;
```

```
                SLOTQ_ATL := SLOTQ_ADR;
                LM[SLOTQ_ADR].SLOTQ_LINKS := 0;
            END

ELSE
            BEGIN
                    The queue is not empty, link at the tail
                LM[SLOTQ_ATL].SLOT_FLINK := SLOTQ_ADR;
                LM[SLOTQ_ADR].SLOT_RLINK := SLOTQ_ATL;
                LM[SLOTQ_ADR].SLOT_FLINK := 0;
                SLOTQ_ATL := SLOTQ_ADR;
            END;
    END;            of procedure SLOTQ_NEW_ATAIL PROCEDURE SLOTQ_NEW_ATAIL_EXT;
**************************************************************
    The purpose of this procedure is to insert the slot assoc.
w/ PTOK at the tail of the extended available slot queue.
**************************************************************

BEGIN

IF SLOTQ_AHD_EXT = H'3FFF' THEN                    empty
        BEGIN
                The queue is empty, link accordingly
            SLOTQ_AHD_EXT := SLOTQ_NUM_EXT;
            SLOTQ_ATL_EXT := SLOTQ_NUM_EXT;
            EXT_LM[SLOTQ_ADR_EXT].SLOTQ_LINKS := H'FFFFFFF';
        END ELSE
        BEGIN
                The queue is not empty, link at the tail
            EXT_LM_ADR := (SLOTQ_ATL_EXT * STK_BLK_SIZE) + EXT_SLOT_BASE;
            EXT_LM[EXT_LM_ADR].SLOT_FLINK := SLOTQ_NUM_EXT;
            EXT_LM[SLOTQ_ADR_EXT].SLOT_RLINK := SLOTQ_ATL_EXT;
            EXT_LM[SLOTQ_ADR_EXT].SLOT_FLINK := H'3FFF';
            SLOTQ_ATL_EXT := SLOTQ_NUM_EXT;
        END;
    END;            of procedure SLOTQ_NEW_ATAIL_EXT PROCEDURE SLOTQ_NEW_EHEAD;
**************************************************************
    The purpose of this procedure is to insert the slot assoc.
w/ PTOK at the head of the empty slot queue.
**************************************************************

BEGIN
    IF SLOTQ_EHD = 0 THEN
        BEGIN
```

```
                    The queue is empty, link accordingly
          SLOTQ_EHD := SLOTQ_ADR;
          LM[SLOTQ_ADR].SLOTQ_LINKS := 0;
       END ELSE
       BEGIN
                    The queue is not empty, link at the tail
          LM[SLOTQ_ADR].SLOT_FLINK := SLOTQ_EHD;
          LM[SLOTQ_ADR].SLOT_RLINK := 0;
          SLOTQ_EHD := SLOTQ_ADR;
       END;
    END;      of procedure SLOTQ_NEW_EHEAD PROCEDURE SLOTQ_NEW_EHEAD_EXT;
*********************************************************************
    The purpose of this procedure is to insert the slot assoc.
w/ PTOK at the head of the extended empty slot queue.
*********************************************************************

BEGIN
    IF SLOTQ_EHD_EXT = H'3FFF' THEN
       BEGIN
                    The queue is empty, link accordingly
          SLOTQ_EHD_EXT := (SLOTQ_ADR_EXT - EXT_SLOT_BASE) DIV H'10';
          EXT_LM[SLOTQ_ADR_EXT].SLOTQ_LINKS := H'FFFFFF';
       END ELSE
       BEGIN
                    The queue is not empty, link at the tail
          EXT_LM[SLOTQ_ADR_EXT].SLOT_FLINK := SLOTQ_EHD_EXT;
          EXT_LM[SLOTQ_ADR_EXT].SLOT_RLINK := H'3FFF';
          SLOTQ_EHD_EXT := (SLOTQ_ADR_EXT - EXT_SLOT_BASE) DIV H'10';
       END;
    END;      of procedure SLOTQ_NEW_EHEAD_EXT PROCEDURE SLOTQ_SELECT;
*********************************************************************
    The purpose of this procedure is to select a slot from
the head of the empty slot queue, if non-zero, otherwise from
the head of the available slot queue.
*********************************************************************

BEGIN
    SLOTQ_ADR := SLOTQ_EHD;
    IF SLOTQ_ADR <> 0 THEN
                    Modify the empty slot queue accordingly
```

```
          SLOTQ_EHD := LM[SLOTQ_ADR].SLOT_FLINK

ELSE
         BEGIN
            SLOTQ_ADR := SLOTQ_AHD;
            IF SLOTQ_ADR <> 0 THEN
               BEGIN

Modify the available slot queue accordingly
                  SLOTQ_AHD := LM[SLOTQ_ADR].SLOT_FLINK;
                  LM[SLOTQ_AHD].SLOT_RLINK := 0;

Return slot to external or main memory accordingly

IF EXT_STATUS_WORD = 1 THEN
                     RETURN_SLOT_TO_EXT_LM
                  ELSE
                     RETURN_SLOT_TO_MM

END

ELSE
               SLOTQ_AHD AND SLOTQ_EHD = 0
               BEGIN
                  REASON := E_AHD_EHD_EQ_0;
                  UNIT_FATAL := 0;                         NON FATAL
                  EXTENDED_INFO.[11..0] := SLOTQ_PTOK;
                  EXTENDED_INFO.[35..24] := SLOTQ_ATL;
                  MAKE_MR;
               END;

END;
END;        of procedure SLOTQ_SELECT

PROCEDURE SLOTQ_SELECT_EXT;
*****************************************************************
     This procedure selects a slot from the head of the extended
empty
     slot queue, if non-zero.  Else, if the the owner of SLOTQ_AHD_EXT
     is not the same as SLOTQ_PTOK then it selects the slot from
     SLOTQ_AHD_EXT else it selects a slot from SLOTQ_ATL_EXT.
     This procedure Will pass SLOTQ_ADR_EXT to caller.
*****************************************************************

VAR
OWNER_ADR : WORD_TYPE;

BEGIN
   SLOTQ_NUM_EXT := SLOTQ_EHD_EXT;
   SLOTQ_ADR_EXT := (SLOTQ_NUM_EXT * STK_BLK_SIZE) + EXT_SLOT_BASE;
```

```
IF SLOTQ_NUM_EXT <> H'3FFF' THEN

Modify the extended empty slot queue accordingly
    SLOTQ_EHD_EXT := EXT_LM[SLOT_ADR_EXT].SLOT_FLINK ELSE
    BEGIN
    OWNER_ADR := (SLOTQ_AHD_EXT * STK_BLK_SIZE) + EXT_SLOT_BASE;
    OWNER_ADR := OWNER_ADR + OWNER_STK;
    OWNER_OF_HD := EXT_LM[OWNER_ADR].SLOT_STK;
    IF (SLOTQ_AHD_EXT <> H'3FFF') AND (OWNER_OF_HD <> SLOTQ_PTOK) THEN

BEGIN

SLOTQ_NUM_EXT := SLOTQ_AHD_EXT;
            Modify the extended available slot queue accordingly SLOTQ_ADR_EXT := (SLOTQ_NUM_EXT * STK_BLK_SIZE) + EXT_SLOT_BASE;
        SLOTQ_AHD_EXT := EXT_LM[SLOTQ_ADR_EXT].SLOT_FLINK;
        EXT_LM_ADR := (SLOTQ_AHD_EXT * STK_BLK_SIZE) + EXT_SLOT_BASE;
        EXT_LM[EXT_LM_ADR].SLOT_RLINK := H'3FFF';

Return slot from EXT_LM to MM accordingly
        RETURN_EXT_SLOT_TO_MM;

END

ELSE

IF OWNER_OF_HD = SLOTQ_PTOK THEN
            BEGIN

SLOTQ_NUM_EXT := SLOTQ_ATL_EXT;
                Our PTOK is at head of AQ so delink from AQ tail SLOTQ_ADR_EXT := (SLOTQ_NUM_EXT * STK_BLK_SIZE) + EXT_SLOT_BASE;
            SLOTQ_ATL_EXT := EXT_LM[SLOTQ_ADR_EXT].SLOT_RLINK;
            EXT_LM_ADR := (SLOTQ_ATL_EXT * STK_BLK_SIZE) + EXT_SLOT_BASE;
            EXT_LM[EXT_LM_ADR].SLOT_FLINK := H'3FFF';

Return slot from EXT_LM tail to MM accordingly
            RETURN_EXT_SLOT_TO_MM;

END
        ELSE
            SLOTQ_AHD AND SLOTQ_EHD = 0
            BEGIN
                REASON := E_AHD_EHD_EQ_O;
                UNIT_FATAL := 0;                    NON FATAL
                EXTENDED_INFO.[11..0] := SLOTQ_PTOK;
                EXTENDED_INFO.[35..24] := SLOTQ_ATL_EXT;
                MAKE_MR;
```

```
        END;
      END;
END;           of procedure SLOTQ_SELECT_EXT

PROCEDURE SLOTQ_WIZARD;
*******************************************************************
     This procedure will handle all "Slot Queue" functions
including
     the distribution of slots and the handling of assoc. slot queues.
*******************************************************************

BEGIN

SLOTQ_ADR := LM[SLOTQ_PTOK].PRST_PTR;
   IF SLOTQ_ADR <> STK_ZEROS_SLOT THEN
      BEGIN

IF SLOTQ_ADR.IN_EXT_LM = 3 THEN
              SLOTQ_MASTER_EXT
           ELSE IF SLOTQ_ADR = IN_MM_STATUS THEN
              SLOTQ_MASTER

ELSE
            BEGIN
               Link slot at the tail of the avail. slot queue
               SLOTQ_AQ_DELINK;
               SLOTQ_NEW_ATAIL;
            END;
      END;
END;           of procedure SLOTQ_WIZARD PROCEDURE RETURN_SLOT_TO_MM;
*******************************************************************
*******************************************************************

BEGIN

Calculate the MM address
   STORE_SLOT_ADR := SLOTQ_ADR;
   STORE_SLOT_ADR.WORD := OWNER_STK;
   STORE_SLOT_STK := LM[STORE_SLOT_ADR].SLOT_STK;
   MM_ADR := (STORE_SLOT_STK * STK_BLK_SIZE);
   MM_ADR := MM_ADR + MM_STK_ADR_BASE;

Setup the LM slot address
   STORE_SLOT_ADR.WORD := CPRI_SLINK;

Setup the MAM address
```

```
            MAM_ADR := MAM_LAST_ALIVE;

Store slot
   FOR I_PAGE := 0 TO 3 DO
      BEGIN

Store slot from LM to MAM
          SAVE_MAM_ADR := MAM_ADR;
          FOR I_PAGE_LM := 0 TO 3 DO
             BEGIN
                MAM[MAM_ADR] := LM[STORE_SLOT_ADR];
                STORE_SLOT_ADR := STORE_SLOT_ADR + 1;
                MAM_ADR := MAM_ADR + 1;
             END;
                    Store slot from MAM to MM
          MAM_ADR := SAVE_MAM_ADR;
          FOR I_PAGE_MM := 0 TO 3 DO
             BEGIN NOTE: Simulates the partial word write operation
                IF I_PAGE = 0 AND I_PAGE_MM = 0 THEN
                   MAM[MAM_LAST_ALIVE].LAST_ALIVE := MM[MM_ADR].LAST_ALIVE;

MM[MM_ADR] := MAM[MAM_ADR];
                MAM_ADR := MAM_ADR + 1;
                MM_ADR := MM_ADR + 1;
             END;

END;             of FOR I := 0 TO 3 DO

LM[STORE_SLOT_STK].PRST_PTR := IN_MM_STATUS;
   END;                of procedure RETURN_SLOT_TO_MM PROCEDURE RETURN_EXT_SLOT_TO_MM;
*****************************************************************
   This routine stores an slot from extended lm to main memory
*****************************************************************

BEGIN
                Calculate the MM address
   STORE_SLOT_ADR := SLOTQ_NUM_EXT;
   STORE_SLOT_ADR := (STORE_SLOT_ADR * STK_BLK_SIZE) + EXT_SLOT_BASE;
   STORE_SLOT_ADR.WORD := OWNER_STK;
   STORE_SLOT_STK := EXT_LM[STORE_SLOT_ADR].SLOT_STK;
   MM_ADR := (STORE_SLOT_STK * STK_BLK_SIZE);
   MM_ADR := MM_ADR + MM_STK_ADR_BASE;

Setup the LM slot address
   STORE_SLOT_ADR.WORD := CPRI_SLINK;
```

```
                   Setup the MAM address
MAM_ADR := MAM_LAST_ALIVE;

Store slot
FOR I_PAGE := 0 TO 3 DO
   BEGIN

Store slot from LM to MAM
      SAVE_MAM_ADR := MAM_ADR;
      FOR I_PAGE_LM := 0 TO 3 DO
         BEGIN
            MAM[MAM_ADR] := EXT_LM[STORE_SLOT_ADR];
            STORE_SLOT_ADR := STORE_SLOT_ADR + 1;
            MAM_ADR := MAM_ADR + 1;
         END;

Store slot from MAM to MM
      MAM_ADR := SAVE_MAM_ADR;
      FOR I_PAGE_MM := 0 TO 3 DO
         BEGIN NOTE: Simulates the partial word write operation
               IF I_PAGE = 0 AND I_PAGE_MM = 0 THEN
                  MAM[MAM_LAST_ALIVE].LAST_ALIVE:=MM[MM_ADR].LAST_ALIVE;

MM[MM_ADR] := MAM[MAM_ADR];
            MAM_ADR := MAM_ADR + 1;
            MM_ADR := MM_ADR + 1;
         END;

END;           of FOR I := 0 TO 3 DO

LM[STORE_SLOT_STK].PRST_PTR := IN_MM_STATUS;

END;           of procedure RETURN_EXT_SLOT_TO_MM

PROCEDURE RETURN_SLOT_TO_EXT_LM;
*****************************************************************
      This routine will first select a extended slot and then
store a slot into it from lm.
*****************************************************************

BEGIN select a slot in ext_slot_queue
   SLOTQ_SELECT_EXT;
              The SLOT has to linked into the available queue
   SLOTQ_NEW_ATAIL_EXT;
```

```
                Calculate the extended lm address
STORE_SLOT_ADR  := SLOTQ_NUM_EXT;
STORE_SLOT_ADR  := (STORE_SLOT_ADR * STK_BLK_SIZE);
STORE_SLOT_ADR  := STORE_SLOT_ADR + EXT_SLOT_BASE;
FETCH_SLOT_ADR  := SLOTQ_ADR;
FETCH_SLOT_ADR.WORD := OWNER_STK;
STORE_SLOT_STK  := LM[FETCH_SLOT_ADR].SLOT_STK;

Clear 4 LSB bits of FETCH_SLOT_ADR
FETCH_SLOT_ADR.WORD := CPRI_SLINK;

Store slot
LM[STORE_SLOT_STK].PRST_PTR_EX := SLOTQ_NUM_EXT;
LM[STORE_SLOT_STK].IN_EXT_LM := H'3';

Store slot WORD 0
EXT_LM[STORE_SLOT_ADR].CPRI := LM[FETCH_SLOT_ADR].CPRI;

store words 1 to 15
FOR I_PAGE := 0 TO 14 DO
    BEGIN

Store slot from LM to EXT_LM

STORE_SLOT_ADR := STORE_SLOT_ADR + 1;
        FETCH_SLOT_ADR := FETCH_SLOT_ADR + 1;
        EXT_LM[STORE_SLOT_ADR] := LM[FETCH_SLOT_ADR];
    END;
END;        of procedure RETURN_SLOT_TO_EXT_LM
```

Some of the many advantages of the invention should now be readily apparent. For example, a novel storage allocation apparatus and method have been provided which are capable of optimizing the usage of memory resources. This apparatus and method is capable of optimizing data access requirements based on data usage requirements. Data access requirements are optimized by minimizing memory access times. By not updating stack order every time that a use occurs, the total overhead to manage the resource is reduced. The likelihood that data resources which will be used again soon will remain relatively readily available is increased.

Obviously, many modifications and variations of the present invention are possible in light of the above teachings. It is therefore to be understood that the foregoing embodiments are presented by way of example only and that, within the scope of the appended claims and equivalents thereto, the invention may be practiced otherwise than as specifically described.

What is claimed is:

1. A multi-level memory for storing data based on the expected use of data, comprising:
   a first level memory for storing data expected to be imminently accessed based on predetermined criteria other than solely a LRU algorithm;
   a second level memory interfaced with the first level memory for storing data that is not likely to be accessed as soon as the data stored in the first level memory based on the predetermined criteria; and
   a third level memory interfaced with the first and second level memories for storing data that is the least recently used of all of the data stored in the multi-level memory.

2. The multi-level memory of claim 1, wherein the second level memory does not store any data unless the first level memory is full.

3. The multi-level memory of claim 1, wherein some of the data is transferred from the first level memory to the second level memory when the first level memory is full and wherein the least recently used data that is stored in the second level memory is moved from the second level memory to the third level memory when the second level memory is full.

4. The multi-level memory of claim 1, wherein the first and second memories together form a local memory and the third level memory resides external of the local memory.

5. The multi-level memory of claim 4, wherein the local memory is used by a task control unit of a data processing system and the third level memory is a portion of a system main memory of the data processing system,
   the task control unit being interfaced with the multi-level memory to write data directly to and access directly data from the first level memory and being interfaced to only indirectly access data from the second level memory and the third level memory.

6. The multi-level memory of claim 1, wherein the first level memory comprises:
   a first predetermined number of slots for storing the data wherein the slots in which data is stored define a first available queue and the remaining slots of the first level memory define a first empty queue.

7. The multi-level memory of claim 6, wherein the second level memory comprises:
   a second predetermined number of slots for storing the data wherein the slots in which data is stored define a second available queue and the remaining slots of the second level memory define a second empty queue; and
   data being stored in the second available queue only when no more slots exist in the first empty queue.

8. The multi-level memory of claim 7, wherein the first available queue and the second available queue are doubly linked queues and the first empty queue and the second empty queue are singly linked queues.

9. The multi-level memory of claim 1, further comprising:
   a local processor for allocating data among the first level memory, second level memory, and third level memory, wherein data is accessed from the first level memory faster than data is accessed from either of the second level memory and third level memory and data is accessed faster from the second level memory than data is accessed from the third level memory.

10. A method of allocating data in a multi-level memory, comprising the steps of:
    storing data in a first level memory;
    transferring some of the data from the first level memory to a second level memory when the first level memory is full; and
    transferring some of the data from the second level memory to a third level memory when the second level memory is full; and
    the data remaining in the first level memory after some of the data is transferred is expected to be imminently used based on predetermined criteria.

11. The method of claim 10, wherein the step of storing data in the second level memory is carried out on a first-in-first-out basis.

12. The method of claim 10, wherein the first level memory comprises a first predetermined number of slots for storing data, those slots in which data is stored define a first available queue and those slots in which no data is stored define a first empty queue, and wherein the step of storing data in the first level memory comprises the steps of:
    determining whether the data to be stored is referenced by one slot of the first available queue and defining said slot as the designated slot;
    determining whether the first available queue has ever been full;
    selecting the designated slot, if defined and if the first available queue has been full, and defining said slot as the selected slot;
    delinking the selected slot from the first available queue;
    transferring the data to be stored to the selected slot; and
    linking the selected slot to a tail of the first available queue.

13. The method of claim 12, further comprising the steps of:
    determining based on the predetermined criteria whether the data to be stored is likely to be accessed again sooner than at least some of the other data stored in the first available queue; and
    carrying out said step of selecting the designated slot only if the data to be stored is determined to be accessed again sooner than at least some of the other data stored in the first available queue.

14. The method of claim 12, further comprising the following step:
    selecting a slot at a head of the first empty queue, if the first available queue is not full and the data to be stored is not referenced by any slot of the first available queue, and defining said slot as the selected slot.

15. The method of claim 12, wherein the second level memory comprises a second predetermined number of slots for storing data, those slots in which data is stored in the second level memory define a second available queue and those slots in which no data is stored in the second level memory define a second empty queue, and wherein the method further comprises the steps of:

determining whether the first available queue is full;

determining, if the first available queue is full, whether the second available queue is full;

selecting a slot at a head of the second available queue, if the first available queue and the second available queue are full;

delinking the selected slot; and transferring the data stored in the selected slot to the third level memory.

16. The method of claim 10, further comprising the steps of:

determining whether or not the data to be stored is referenced in second level memory and, if so, then transferring the information referenced by the data from the second level memory to the first level memory; and determining whether or not the data to be stored is referenced in the third level memory, and if so, transferring the information referenced by the data from the third level memory to the first level memory.

17. A multi-level memory system for use by a task control unit (TCU) of a data processing system, said data processing system having a system main memory, a portion of said system main memory being allocated to the TCU and defining TCU dedicated main memory, the system comprising:

a task control processing means for processing state statistics associated with stack processing carried out by the data processing system; and a TCU local memory interfaced with the task control processing means comprising a first level memory for storing stack state information, a second level memory for storing stack state information, and a state stack memory for storing pointers identifying where in first level memory, second level memory and TCU dedicated main memory stack state information is stored.

18. The system of claim 17, wherein the first level memory operates at a faster speed than the second level memory and the TCU dedicated main memory, and wherein the task control processing means stores stack state information in the first level memory until the first level memory is full and subsequently maintains the stack state information that is most likely to be imminently accessed based on predetermined criteria in the first level memory and transfers stack state information that is less likely to be accessed to the second level memory.

19. The system of claim 18, wherein the second level memory operates at a faster speed than the TCU dedicated main memory, and wherein the task control processing means continues to transfer stack state information from the first level memory to the second level memory while the first level memory is full, and when the second level memory is filled, transfers stack state information from the second level memory to the TCU dedicated main memory.

20. The system of claim 18, wherein the state stack memory is updated each time data is stored in and transferred from any of the first level memory, second level memory, and the TCU dedicated main memory, and when a stack is being operated on by the data processing system, the task control processing means determines whether said stack is referenced in one of the second level memory and the TCU dedicated main memory, and if so, the task control processing means transfers the stack state information associated with said stack so referenced to the first level memory.

\* \* \* \* \*